United States Patent
Ohtsu

(10) Patent No.: US 6,612,662 B2
(45) Date of Patent: Sep. 2, 2003

(54) ANTI-SKID CONTROL SYSTEM FOR AUTOMOTIVE VEHICLE

(75) Inventor: Nobuyuki Ohtsu, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 10/101,379

(22) Filed: Mar. 20, 2002

(65) Prior Publication Data

US 2002/0135229 A1 Sep. 26, 2002

(30) Foreign Application Priority Data

Mar. 23, 2001 (JP) ........................................ 2001-084701

(51) Int. Cl.[7] .............................. B60T 8/66; B60T 8/58; B60T 8/70
(52) U.S. Cl. .......................... 303/156; 701/71; 303/157
(58) Field of Search .................................. 303/156, 157, 303/199, 166, 167, 119.1, 174, 176, 177, 178, 184, 158; 701/71, 74, 80, 81

(56) References Cited

U.S. PATENT DOCUMENTS 4,852,953 A * 8/1989 Brearley et al. .............. 701/78

FOREIGN PATENT DOCUMENTS

JP 6-144195 5/1994
JP 7-117653 5/1995

* cited by examiner

Primary Examiner—Douglas C. Butler
(74) Attorney, Agent, or Firm—Foley & Lardner

(57) ABSTRACT

An anti-skid control system for an automotive vehicle includes a hydraulic modulator having electromagnetic solenoid valves for regulating a wheel-brake cylinder pressure at each of road wheels. A skid control unit prevents a wheel lock-up condition by controlling the wheel-brake cylinder pressure via on/off reaction of the solenoid valves in response to a pulse signal based on a wheel speed detected by a wheel speed sensor. The skid control unit has a data processing section that generates a desired wheel speed based on the wheel speed, calculates a desired brake-fluid pressure based on an integrated value of a wheel-speed deviation between the desired wheel speed and the wheel speed, sets a controlled ON pulse width based on the desired brake-fluid pressure, and outputting the pulse signal having the controlled pulse width to the solenoid valves after a lapse of a preset pulse width from a previous pulse signal output.

17 Claims, 11 Drawing Sheets

ANTI-SKID CONTROL SYSTEM FOR AUTOMOTIVE VEHICLE

TECHNICAL FIELD

The present invention relates to an anti-skid control system executing anti-skid control (simply, skid control) according to which brake pressure at a wheel-brake cylinder is controlled to prevent wheel lock-up during braking, and particularly to an anti-skid control system capable of controlling the wheel-brake cylinder pressure by way of on/off reaction of solenoid valves incorporated within a hydraulic modulator.

BACKGROUND ART

As is generally known, an anti-skid control system, usually abbreviated to an "ABS" system, is used many automotive vehicles, for controlling the wheel-brake cylinder pressure in such a manner as to prevent wheel lock-up during braking, thus ensuring a stable vehicle behavior (enhanced vehicle stability). Such an anti-skid control system is generally constructed to properly repeatedly execute a pressure build-up control mode at which the wheel-brake cylinder pressure is built up, a pressure reduction control mode at which the wheel-brake cylinder pressure is reduced, a pressure hold control mode at which the wheel-brake cylinder pressure is held constant, and a moderate pressure build-up control mode at which the wheel-brake cylinder pressure is gradually built up, depending upon the relative relationship between the vehicle speed and the wheel speed, that is, a slip ratio. During the wheel-brake cylinder pressure control (during skid control), the operation of an electronically controlled fluid-pressure control valve, such as a pressure build-up valve or a pressure reduction valve, is controlled by means of an ABS control module or an ABS control unit. In an anti-lock control device disclosed in Japanese Patent Provisional Publication No. 6-144195, for the purpose of skid control, PID (proportional plus integral plus derivative) control is made to a linear-actuated solenoid valve capable of continuously controlling a brake-fluid pressure by adjusting a value of current applied thereto. A combination of the PID control and the linear-actuated solenoid valve ensures a high control accuracy. However, the linear-actuated solenoid valve is so expensive and complicated in construction. Also, the derivative component of the PID control is apt to be affected by noises input from the road surface, and thus there is a possibility of excessive pressure build-up or excessive pressure reduction. In contrast, in the brake hydraulic pressure controller disclosed in Japanese Patent Provisional Publication No. 7-117653, on/off reaction of solenoid valves incorporated within a hydraulic modulator is controlled by way of duty-cycle control. In such an ABS system employing duty-cycle controlled solenoid valves within a hydraulic modulator, taking into account road surface conditions, such as a so-called $\mu$-jump road surface condition that a transition between a low-$\mu$ road and a high-$\mu$ road occurs, a moderate pressure build-up operating mode or a moderate pressure reduction operating mode is executed as follows.

For instance, in order to achieve the moderate pressure build-up, the pulse width of pulse signals output to the solenoid valve during a preset period of time (or a predetermined constant operating cycle) is controlled to gradually increase from 3 msec through 4 msec and 5 msec to 6 msec, in that order. In contrast, assuming that the pulse width of pulse signals output during the pressure build-up operating mode is kept constant and additionally the pressure build-up rate is set at a relatively high value, there is a tendency for the wheel to lock up again during the initial pressure build-up operating mode executed after the pressure reduction operating mode, during driving on a low-$\mu$ road surface. Assuming that the pressure build-up rate is set at a relatively low value with the pulse width kept constant, there is a problem of an undesirably long pressure build-up time interval and a lack of the braking force. Furthermore, in the event that a so-called $\mu$-jump or $\mu$-change that a friction factor of the road surface changes from low to high takes place with the relatively low pressure build-up rate and with the pulse width kept constant, a recovery time to an appropriate wheel-brake cylinder pressure suitable for the high-$\mu$ road surface condition tends to become undesirably long. This also causes a lack of the braking force.

In contrast to the above, when gradually increasing the pulse width for the preset time period so as to gradually increase the pressure build-up rate with the lapse of the pressure build-up time, it is possible to properly build up the wheel-brake cylinder pressure, preventing wheel lock-up from occurring again during driving on the low-$\mu$ road. In the event that a so-called $\mu$-jump occurs, it is possible to effectively reduce the recovery time to the appropriate wheel-brake cylinder pressure suitable for the high-$\mu$ road surface condition, thus avoiding the lack of braking force.

In the same manner as discussed above, assuming that the pulse width is kept constant and additionally the pressure reduction rate is kept at a relatively high value, there is a tendency for brake fluid in the wheel-brake cylinder to be excessively returned via a reservoir to the master-cylinder side by means of an ABS pump (a return pump). This increases the recovery time to an appropriate wheel-brake cylinder pressure at the next pressure build-up operating mode. Additionally, the amount of brake fluid being pumped out by the ABS pump tends to increase. Conversely when the pressure reduction rate is kept at a relatively low value, it takes a long time until the wheel lock-up condition has been neutralized. In particular, when a $\mu$-jump that a friction factor of the road surface changes from high to low occurs, a recovery time to an appropriate wheel-brake cylinder pressure suitable for the low-$\mu$ road surface condition tends to become undesirably long. To avoid this, during the moderate pressure reduction operating mode, an ON pulse width of pulse signals output to the pressure reduction solenoid valve is gradually increased with the lapse of the pressure reduction time. However, the previously noted conventional anti-skid control system employing the duty-cycle controlled solenoid valves has the following drawbacks.

That is, when gradually increasing the pulse width in accordance with an increase in the pressure build-up time or when gradually increasing the pulse width in accordance with an increase in the pressure reduction time, at the last stage of the predetermined operating cycle, there is a tendency for the wheel-brake cylinder pressure to overshoot the desired wheel-brake cylinder pressure level. Owing to the overshoot, brake fluid is wastefully exhausted from the wheel-brake cylinder to the reservoir. This increases an amount of work of the ABS pump serving to induct the brake fluid in the reservoir into the master cylinder side. That is to say, in the conventional ABS system, there is a limitation to an adaptability to a rapid change in the friction factor of the road surface, such as in the event of the occurrence of the $\mu$-jump road condition. The above-mentioned overshooting deteriorates the convergence to the desired pressure level. Additionally, owing to the occurrence of overshooting, a large-capacity of ABS pump is required. This increases the ABS system manufacturing costs and also results in an increased weight of the ABS system. When gradually increasing the ON pulse width during the predetermined constant operating cycle, there is a problem of a resonance occurring due to the predetermined constant operating cycle of the ABS system. There is another problem of a great change in the wheel-brake cylinder pressure, occurring in the event of the output of a pulse signal having a wide ON pulse width. This deteriorates the noise/vibration reduction performance.

SUMMARY OF THE INVENTION

Accordingly, it is an object of the invention to provide an anti-skid control system capable of controlling a wheel-brake cylinder pressure by on/off reaction of solenoid valves, which system effectively enhances a noise/vibration reduction performance.

In order to accomplish the aforementioned and other objects of the present invention, an anti-skid control system for an automotive vehicle comprises a wheel speed sensor that outputs a sensor signal indicative of a wheel speed at each of road wheels on the vehicle, a hydraulic modulator having electromagnetic solenoid valves for regulating a wheel-brake cylinder pressure at each of the road wheels, a skid control unit configured to be electronically connected to the wheel speed sensor and the solenoid valves for preventing a wheel lock-up condition by controlling the wheel-brake cylinder pressure via on/off reaction of the solenoid valves in response to a pulse signal based on the wheel speed, the skid control unit comprising a desired wheel speed generation section that generates a desired wheel speed based on the wheel speed, a wheel-speed deviation calculation section that calculates a wheel-speed deviation between the desired wheel speed and the wheel speed, a desired brake-fluid pressure calculation section that calculates a desired brake-fluid pressure based on an integrated value of the wheel-speed deviation, a controlled ON pulse width setting section that sets a controlled ON pulse width based on the desired brake-fluid pressure, and a pulse output control section that outputs the pulse signal having the controlled pulse width to the solenoid valves after a lapse of a preset pulse width from a previous pulse signal output.

According to another aspect of the invention, an anti-skid control system for an automotive vehicle comprises a wheel speed detection means for outputting a sensor signal indicative of a wheel speed at each of road wheels on the vehicle, hydraulic modulating means having electromagnetic solenoid valves for regulating a wheel-brake cylinder pressure at each of the road wheels, skid control means configured to be electronically connected to the wheel speed detection means and the solenoid valves, for preventing a wheel lock-up condition by controlling the wheel-brake cylinder pressure via on/off reaction of the solenoid valves in response to a pulse signal based on the wheel speed; the skid control means comprising desired wheel speed generation means for generating a desired wheel speed based on the wheel speed wheel-speed deviation calculation means for calculating a wheel-speed deviation between the desired wheel speed and the wheel speed, desired brake-fluid pressure calculation means for calculating a desired brake-fluid pressure based on an integrated value of the wheel-speed deviation, controlled ON pulse width setting means for setting a controlled ON pulse width based on the desired brake-fluid pressure, and pulse output control means for outputting the pulse signal having the controlled pulse width to the solenoid valves after a lapse of a preset pulse width from a previous pulse signal output.

According to a further aspect of the invention, an anti-skid control method of an automotive vehicle employing an anti-skid control system for preventing a wheel lock-up condition by controlling a wheel-brake cylinder pressure at each of road wheels via on/off reaction of solenoid valves of a hydraulic modulator in response to a pulse signal based on the wheel speed, the method comprises detecting a wheel speed at each of the road wheels on the vehicle, generating a desired wheel speed based on the wheel speed, calculating a wheel-speed deviation between the desired wheel speed and the wheel speed, calculating a desired brake-fluid pressure based on an integrated value of the wheel-speed deviation, setting a controlled ON pulse width based on the desired brake-fluid pressure, and outputting the pulse signal having the controlled pulse width to the solenoid valves after a lapse of a preset pulse width from a previous pulse signal output.

The other objects and features of this invention will become understood from the following description with reference to the accompanying drawings.

DESCRIPTION OF THE PREFERRED EMBODIMENTS

Figure 2:
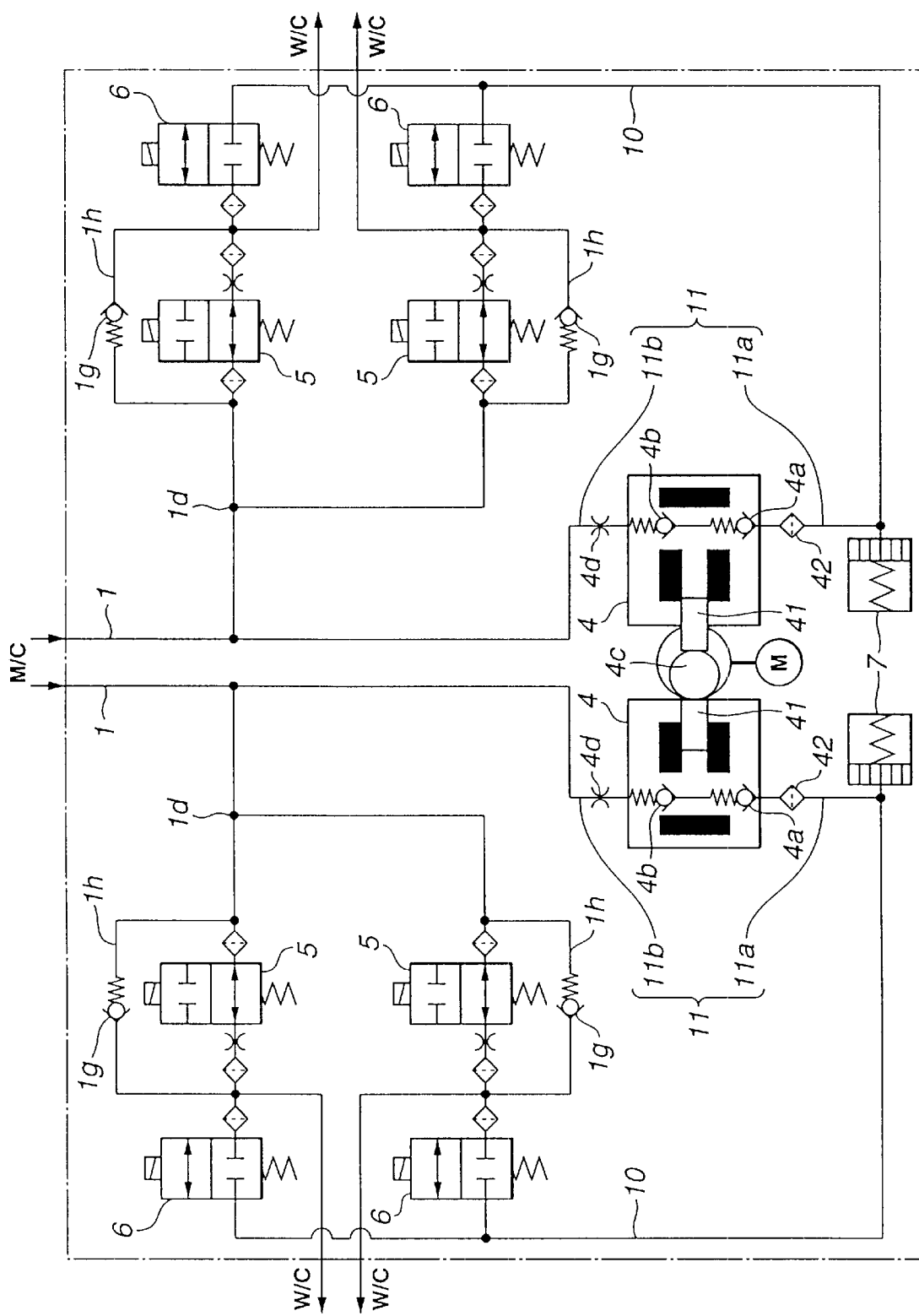
FIG. 2 is a general system diagram showing the anti-skid control system of the embodiment.
Figure 3:
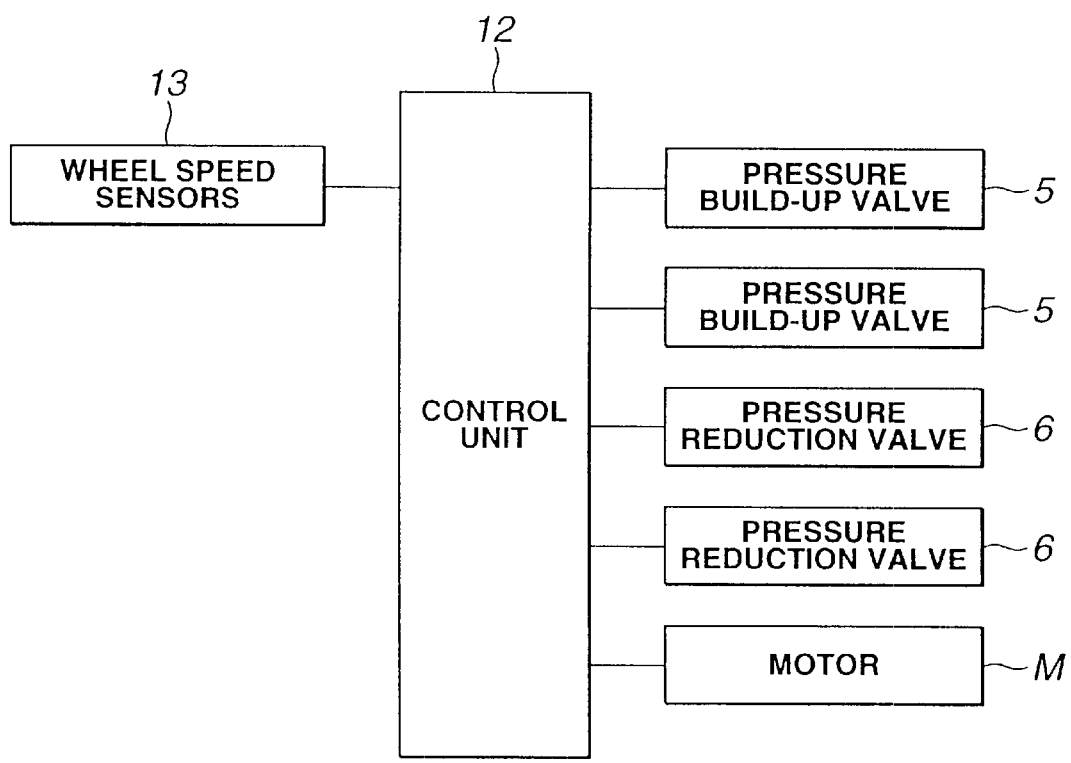
FIG. 3 is a control unit circuit diagram of a control unit incorporated in the anti-skid control system of the embodiment.

Referring now to the drawings, particularly to FIGS. 2 and 3, the anti-skid control system of the invention is exemplified in a front-wheel-drive vehicle equipped with a dual brake system (a dual brake-circuit layout). In FIG. 2, M/C denotes a master cylinder. Master cylinder M/C is constructed by a typical tandem master cylinder with two pistons in tandem. The master cylinder is connected via primary and secondary brake circuits (1, 1) to respective wheel-brake cylinders (W/C, W/C, W/C, W/C). As can be appreciated from comparison between the primary and secondary brake circuit diagrams shown in FIG. 2, the operation is similar in the two brake circuits or two brake systems. Thus, the same reference signs used to designate elements in the primary brake system will be applied to the corresponding reference signs used in the secondary brake system. Each brake circuit 1 is branched via a branch point 1d into two wheel cylinders (W/C, W/C). A pair of pressure build-up valves (5, 5) are provided downstream of the branch point 1d. When each of pressure build-up valves (5, 5) is de-energized, the pressure build-up valve is kept at its full-open position. Conversely when each of pressure build-up valves (5, 5) is energized, the pressure build-up valve is kept at its fully-closed position. That is, each of the pressure build-up valves is comprised of a normally-open two-port two-position electromagnetic solenoid valve whose on/off reaction can be controlled by way of duty-cycle control or on/off control. According to the duty-cycle control, solenoid valve is cyclically opened and closed with a controlled duty cycle or a controlled duty ratio. According to the on/off control, the valve position of the solenoid valve is switchable between a fully-open position and a fully-closed position depending upon whether a control signal or a drive signal applied to the solenoid valve is in a HIGH mode or a LOW mode. A bypass line 1h is provided parallel to each pressure build-up valve 5, to smoothly return brake fluid from the associated wheel cylinder back to the master cylinder side, when the braking operation terminates. As shown in FIG. 2, a one-way check valve 1g is fluidly disposed in the bypass line 1h, so as to permit the passage of brake fluid in one direction only, that is, in a direction of back flow from the downstream side (the wheel-brake cylinder side) to the upstream side (the master cylinder side). A drain line or a drain circuit 10 is connected to the downstream end of each pressure build-up valve 5, in such a manner as to intercommunicate the brake circuit 1 and a reservoir 7 therevia. A pressure reduction valve 6 is fluidly disposed in drain circuit 10. When each of pressure reduction valves (6, 6) is de-energized, the pressure reduction valve is kept at its fully-closed position. Conversely when each of pressure reduction valves (6, 6) is energized, the pressure reduction valve is kept at its full-open position. That is, each of the pressure reduction valves is comprised of a normally-closed two-port two-position electromagnetic solenoid valve whose on/off reaction can be controlled by way of duty-cycle control or on/off control. Drain circuit 10 is connected via are flux circuit 11 to a portion of brake circuit 1 located at the upstream side of branch point 1d. Are turn pump or an ABS pump 4 is fluidly disposed in a substantially middle of the reflux circuit 11, for returning brake fluid stored in reservoir 7 into brake circuit 1. For the reasons set forth above, reflux circuit 11 is comprised of a suction or induction circuit 11a connected to the reservoir, and a discharge circuit 11b connected to a line on the master cylinder side. Return pump 4 is comprised of a motor-driven plunger pump. Return pump 4 includes a motor-driven eccentric cam 4c, and a pair of plungers (41, 41) diametrically opposing each other with respect to eccentric cam 4c, so that inboard ends of plungers (41, 41) are in operative engagement with the cam profile of eccentric cam 4c. When a motor M is energized and thus a motor driven shaft is rotated, the plungers reciprocate in response to rotation of the motor driven shaft. By way of reciprocating motion of each of the plungers, brake fluid is sucked from induction circuit 11a and the brake fluid is discharged into discharge circuit 11b. An induction valve 4a and a discharge valve 4b are respectively disposed in the induction circuit 11a and the discharge circuit 11b for the purpose of prevention of back flow. Additionally, a filter member 42 is provided in the induction circuit side. On the other hand, the discharge circuit 11b includes a damper 4d for absorbing pulsation of the brake fluid discharged from return pump 4.

With the previously-discussed arrangement, when the road wheel has a tendency to lock during braking, pressure build-up valve 5 that is disposed in the hydraulic circuit connected to the wheel-brake cylinder having a tendency to lock is shifted to the fully-closed position, while pressure reduction valve 6 is shifted to the full-open position, so that brake fluid in the wheel-brake cylinder is exhausted into the reservoir and thus the wheel-brake cylinder pressure is reduced. That is to say, the ABS system of the embodiment initiates the pressure reduction operating mode. Subsequently to the pressure reduction operating mode, the ABS system initiates a pressure build-up operating mode at which pressure build-up valve 5 is shifted again to the full-open position or spring-loaded position so that the master-cylinder pressure is supplied to the wheel-brake cylinder. In this manner, the pressure reduction operating mode and the pressure build-up operating mode are repeatedly executed during skid control. Alternatively, during the skid control, a pressure hold operating mode may be added to the pressure reduction operating mode and the pressure build-up operating mode, as necessary. During the pressure hold operating mode, pressure build-up valve 5 and pressure reduction valve 6 are both kept at their fully-closed positions. As discussed above, the ABS system shown in FIG. 2 performs the skid control so as to prevent skidding and thus provide maximum effective braking. Details of the skid control executed by the ABS system of the embodiment will be fully described later in reference to the flow chart of FIG. 4.

The skid control is executed by means of an electronic control unit (ECU) or a skid control unit 12 shown in FIG. 3. Skid control unit 12 usually comprises a microcomputer. Although it is not clearly shown in FIG. 3, skid control unit 12 includes a central processing unit (CPU) or a microprocessor that performs necessary arithmetic-calculations, processes informational data, compares signals from engine/vehicle sensors to preprogrammed threshold values, and makes necessary decisions of acceptance, memories (RAM, ROM), and an input/output interface. Actually, skid control unit 12 performs various data processing actions (described later) shown in FIGS. 4 through 11E. The input interface of skid control unit 12 receives input informational data from various engine/vehicle sensors, that is, four wheel speed sensors (13, 13, 13, 13). Wheel speed sensors (13, 13, 13, 13) placed at the respective road wheels are provided to continuously monitor or detect each individual wheel's rotational speed and relay this signal to the input interface of skid control unit 12. The memories store preprogrammed or predetermined data such as various threshold values and temporarily store the results of arithmetic-calculations and the necessary decisions made by the CPU. The output interface of skid control unit 12 is configured to be electronically connected to each of directional control valves, that is the two pressure build-up valves (5, 5) and the two pressure reduction valves (6, 6) all included in a hydraulic modulator, to produce a control command signal to the control valves associated with each individual wheel-brake cylinder W/C as well as the motor of return pump 4, based on the results of arithmetic-calculations and decisions performed by the CPU.

Figure 4:
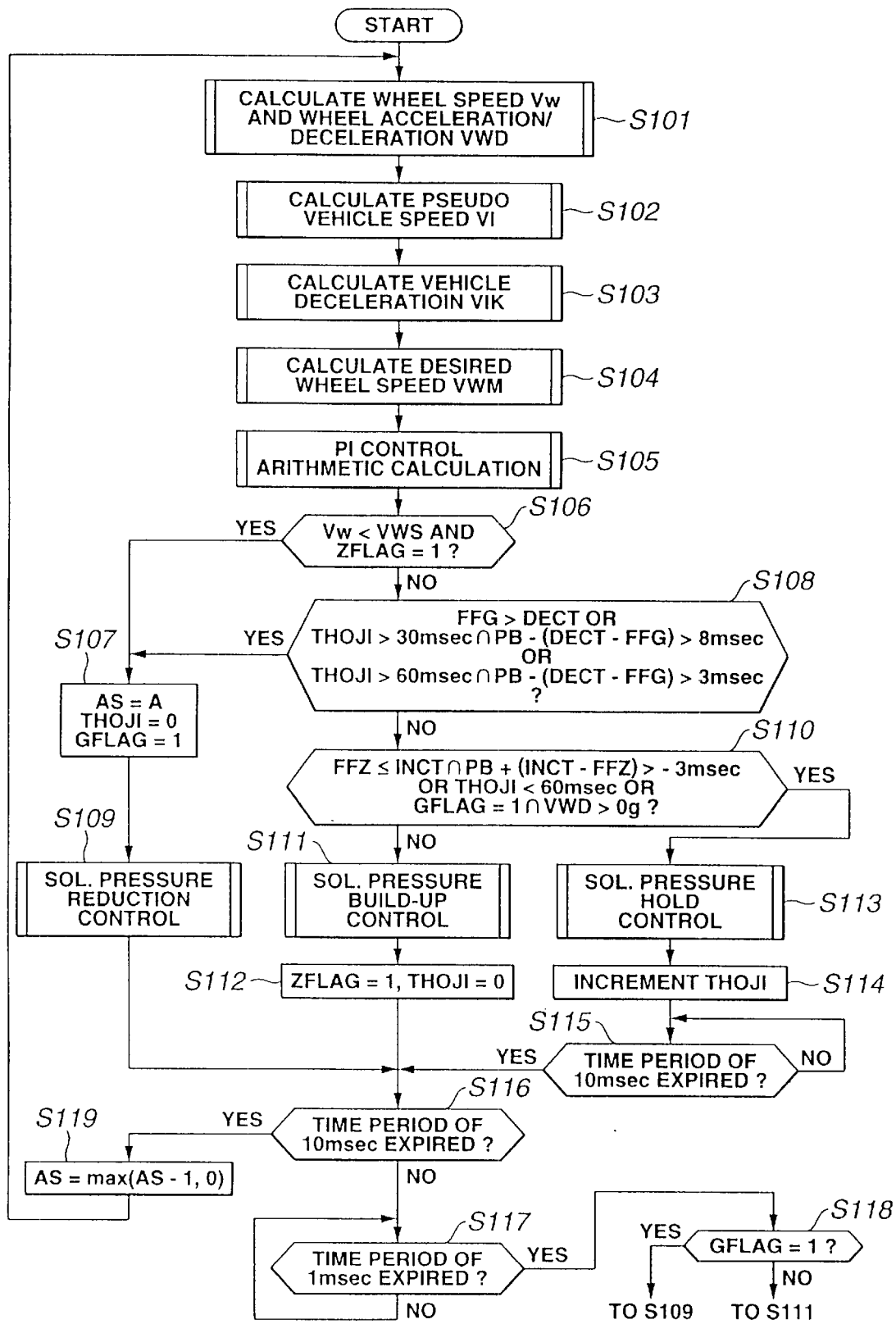
FIG. 4 is a flow chart showing an anti-skid control routine executed by a processor contained in the control unit of the ABS system of the embodiment.

Referring now to FIG. 4, there is shown the skid control routine executed by the anti-skid control system of the embodiment and preprogrammed in the CPU of skid control unit 12. The skid control routine is executed as time-triggered interrupt routines to be triggered every predetermined time intervals such as 10 milliseconds.

At step S101, the more recent wheel speed indicative data signals (that is, the latest up-to-date information being received from the four wheel speed sensors 13), are read. Then, the wheel-speed sensor signal frequency is computed based on the number of pulses and a signal frequency of a sensor pulse signal from each of wheel speed sensors 13. On the basis of the sensor frequency at each road wheel, a wheel speed Vw at each road wheel (a front-right wheel speed VwFR, a front-left wheel speed VwFL, a rear-right wheel speed VwRR, and a rear-left wheel speed VwRL), and a wheel acceleration/deceleration (simply, a wheel acceleration) VWD at each road wheel (a front-right wheel acceleration/deceleration VWDFR, a front-left wheel acceleration/deceleration VWDFL, a rear-right wheel acceleration/deceleration VWDRR, and a rear-left wheel acceleration/deceleration VWDRL) are arithmetically calculated. The positive value of wheel acceleration VWD means a wheel acceleration value, while the negative value of wheel acceleration VWD means a wheel deceleration value.

At step S102, a pseudo vehicle speed VI is calculated based on the four wheel speeds VwFR, VwFL, VwRR, and VwRL. Details of arithmetic calculation for pseudo vehicle speed VI will be hereinafter described in reference to the flow chart of FIG. 5.

At step S103, a vehicle deceleration VIK is calculated based on a time rate of change in pseudo vehicle speed VI. Details of arithmetic calculation for vehicle deceleration VIK will be hereinafter described in reference to the flow chart of FIG. 6.

At step S104, a desired wheel speed VWM is calculated. Details of arithmetic calculation for desired wheel speed VWM will be hereinafter described in reference to the flow chart of FIG. 7.

At step S105, a PI control (proportional plus integral control) arithmetic processing is executed to derive a desired brake-fluid pressure PB. According to the PI control, its output is obtained as the sum of a proportional term and an integrating term with an adjustable gain for each term. Details for the PI control arithmetic processing will be hereinafter described in reference to the flow chart of FIG. 8.

At step S106, a check is made to determine whether the wheel speed Vw of each road wheel is less than an optimum slip ratio value VWS (an optimum-slip-ratio wheel-speed value) corresponding to a criterion for determining whether the pressure reduction control (pressure reduction operating mode) has to be initiated. Additionally, at step S106, another check is made to determine whether a pressure build-up operating mode indicative flag (simply, a pressure build-up flag) ZFLAG is set (=1) or reset (=0). ZFLAG=1 indicates that the ABS system is in the pressure build-up operating mode. In contrast, ZFLAG=0 indicates that the ABS system is out of the pressure build-up operating mode. When the answer to step S106 is in the affirmative (YES), that is, when Vw<VWS and ZFLAG=1, the skid control routine proceeds from step S106 to step S107. Conversely, when the answer to step S106 is in the negative (NO), that is, when VW$\geq$VWS or ZFLAG=0, the skid control routine proceeds from step S106 to step S108.

At step S107, an anti-skid timer AS indicating that the anti-skid control system (ABS system) is active is set to a predetermined value A, and a pressure hold timer THOJI indicating that the ABS system is in the pressure hold operating mode is cleared to "0". Additionally, a pressure reduction operating mode indicative flag (simply, a pressure reduction flag) GFLAG is set to "1". GFLAG=1 indicates that the ABS system is in the pressure reduction operating mode. In contrast, GFLAG=0 indicates that the ABS system is out of the pressure reduction operating mode. After step S107, the routine proceeds to step S109 to initiate the solenoid pressure reduction control (pressure reduction operating mode). During the pressure reduction control, the ABS system outputs a control signal corresponding to a desired duty cycle to the pressure reduction valve 6. In response to the control signal of the desired duty cycle, the opening degree of the pressure reduction valve is controlled, and thus the degree of pressure reduction of the wheel-brake cylinder subjected to skid control is controlled.

In contrast to the above, when the answer to step S106 is in the negative, that is, when Vw=VWS or ZFLAG=0, step S108 occurs. At step S108, a check is made to determine whether either of a first group of conditions is satisfied. A first condition of the first group of conditions is defined by an inequality FFG>DECT, where FFG denotes a feed-forward pressure-reduction controlled variable, and DECT denotes a counted value of a pressure-reduction timer. That is, FFG>DECT means that feed-forward pressure-reduction controlled variable FFG is greater than pressure-reduction timer counted value DECT. In other words, FFG>DECT means that pressure reduction timer counted value DECT does not yet reach feed-forward pressure-reduction controlled variable FFG. A second condition of the first group is defined by a logical expression THOJI>30 msec∩PB−(DECT−FFG)>8 msec. That is, the second condition is satisfied when pressure hold timer counted value THOJI exceeds 30 milliseconds and additionally the difference {PB−(DECT−FFG)} between the current value of desired brake-fluid pressure PB and the difference (DECT−FFG) between pressure reduction timer counted value DECT and feed-forward pressure-reduction controlled variable FFG exceeds 8 milliseconds. The difference {PB−(DECT−FFG)} represents a pressure reduction time GAW (described later). Conversely when THOJI$\leq$30 ms or {PB−(DECT−FFG)}$\leq$8 ms, the second condition is unsatisfied. On the other hand, a third condition of the first group is defined by a logical expression THOJI>60 msec∩PB−(DECT−FFG)>3 msec. That is to say, the third condition of the first group is satisfied when the pressure hold timer counted value THOJI exceeds 60 milliseconds and additionally the pressure reduction time {PB−(DECT−FFG)} exceeds 3 milliseconds. Conversely when THOJI$\leq$60 ms or PB−(DECT−FFG)$\leq$3 ms, the third condition of the first group is unsatisfied. The variable PB is the current value of the desired brake-fluid pressure, whereas pressure reduction timer counted value DECT corresponds to an integrated value of the execution time of the pressure reduction control operating cycle. As discussed above, the necessary condition needed to advance from step S108 via step S107 to the pressure reduction control of step S109 corresponds to either of (i) the first condition that pressure reduction timer counted value DECT does not yet reach feed-forward pressure-reduction controlled variable FFG, (ii) the second condition that the valve-opening time period of pressure reduction valve 6 corresponding to desired brake-fluid pressure PB exceeds 8 milliseconds during the pressure hold operating mode which is continually executed for 30 milliseconds or more after initiation of the feed-forward pressure-reduction control, and (iii) the third condition that the valve-opening time period of pressure reduction valve 6 corresponding to desired brake-fluid pressure PB exceeds 3 milliseconds during the pressure hold operating mode which is continually executed for 60 milliseconds or more after initiation of the feed-forward pressure-reduction control. Actually, the desired brake-fluid pressure PB is converted into the valve-opening time period of the solenoid valve (pressure reduction valve 6 or pressure build-up valve 5) by multiplying the desired brake-fluid pressure with a conversion factor K (corresponding to each of proportional gains KP and KI described later). When the answer to step S108 is in the affirmative (YES), that is, when either of the first group of conditions is satisfied, the routine proceeds from step S108 via step S107 to step S109, so as to execute the pressure reduction control (the pressure reduction operating mode). Conversely when the answer to step S108 is in the negative (NO), that is, when all of the first group of conditions are unsatisfied, the routine flows from step S108 via step S110 to either one of steps S111 and S113.

At step S110, a check is made to determine whether either of a second group of conditions is satisfied. A first condition of the second group is defined by a logical expression FFZ≦INCT∩PB+(INCT−FFZ)>−3 msec, where FFZ denotes a feed-forward pressure build-up controlled variable, and INCT denotes a counted value of a pressure build-up timer. In case of pressure build-up, pressure build-up timer counted value INCT and feed-forward pressure build-up controlled variable FFZ are both given as negative values. The first condition is satisfied when feed-forward pressure build-up controlled variable FFZ is less than or equal to pressure build-up timer counted value INCT and additionally the sum {PB+(INCT−FFZ)} of the current value of desired brake-fluid pressure PB and the difference (INCT−FFZ) between pressure build-up timer counted value INCT and feed-forward pressure build-up controlled variable FFZ is greater than −3 milliseconds. The absolute value of the sum {PB+(INCT−FFZ)} represents a pressure build-up time ZAW (described later). Conversely when FFZ>INCT or {PB+(INCT−FFZ)}−3 msec, the first condition is unsatisfied. A second condition of the second group is defined by an inequality THOJI<60 msec. That is, the second condition of the second group is satisfied when pressure hold timer counted value THOJI is less than 60 milliseconds. Conversely when THOJI=60 msec, the second condition of the second group is unsatisfied. A third condition of the second group is defined by a logical expression GFLAG=1∩VWD>0 g (g denotes acceleration of gravity). That is, the third condition of the second group is satisfied when pressure reduction flag GFLAG is set (=1) and additionally wheel acceleration VWD exceeds 0 g. When the answer to step S110 is in the affirmative (YES), that is, when either of the second group of conditions is satisfied, the routine proceeds from step S110 to step S113, so as to execute the pressure hold control. Conversely when the answer to step S110 is in the negative (NO), that is, when all of the second group of conditions are unsatisfied, the routine flows from step S110 to step S111, so as to execute the pressure build-up control (the pressure build-up operating mode). That is, the necessary condition needed to advance from step S110 to the pressure build-up control of step S111 corresponds to a condition that pressure build-up timer counted value INCT does not yet reach feed-forward pressure build-up controlled variable FFZ (i.e., FFZ>INCT), and the pressure hold operating mode has been executed for at least 60 milliseconds, and wheel acceleration VWD is less than or equal to 0 g.

After execution of the pressure build-up control of step S111, step S112 occurs. At step S112, pressure build-up flag ZFLAG is set (=1) and pressure hold timer THOJI is reset to "0". On the other hand, after execution of the pressure hold control of step S113, the pressure hold timer counted value THOJI is incremented by "1" at step S114, and then at step S115 a check is made to determine whether a predetermined time period of 10 milliseconds has expired. When the answer to step S115 is in the affirmative (YES), that is, only upon expiration of the predetermined time period of 10 milliseconds, the routine proceeds from step S115 to step S116. Step S115 is repeatedly executed until such time that the predetermined time period of 10 milliseconds has expired. Also, after execution of the pressure reduction control of step S109 or after step S112, the routine proceeds to step S116.

At step S116, in the same manner as step S115, a check is made to determine whether a predetermined time period of 10 milliseconds has expired. When the predetermined time period of 10 milliseconds has not yet expired after execution of the pressure reduction control of step S109 or after execution of the pressure build-up control of step S111, the routine proceeds to step S117. At step S117, a check is made to determine whether a predetermined time period of 1 millisecond has expired. Upon only expiration of the predetermined time period of 1 millisecond, the routine proceeds from step S117 to step S118. At step S118, a check is made to determine whether pressure reduction flag GFLAG is set (=1). When GFLAG=1, that is, during the pressure reduction control, the routine flows from step S118 to step S109. Conversely when GFLAG≠1, that is, during the pressure build-up control, the routine flows from step S118 to step S111. Step S117 is repeatedly executed until such time that the predetermined time period of 1 millisecond has expired. In other words, as can be appreciated from the flow from step S117 via step S118 to either of steps S109 and S111, in the case of the pressure reduction operating mode or the pressure build-up operating mode, the procedure of step S109 or the procedure of step S111 is repeatedly executed for each predetermined time period of 1 millisecond. Only upon expiration of the predetermined time period of 10 milliseconds, the routine proceeds from step S116 to step S119. At step S119, first of all, the counted value of anti-skid timer AS is decremented by "1", in other words, the current value $AS_{(n)}$ of the anti-skid timer counted value is updated by the difference $(AS_{(n-1)} -1)$ between the previous value $AS_{(n-1)}$ of the antiskid timer counted value and "1". The difference $(AS_{(n-1)} -1)$ is simply represented as (AS−1). Secondly, two values, namely (AS−1) and 0 are compared to each other, and thereafter a higher one of the two values (AS−1) and 0 is selected as the current value of the anti-skid timer counted value by way of a so-called select-HIGH process AS=max(AS−1, 0). After step S119, the routine returns to step S101.

Figure 5:
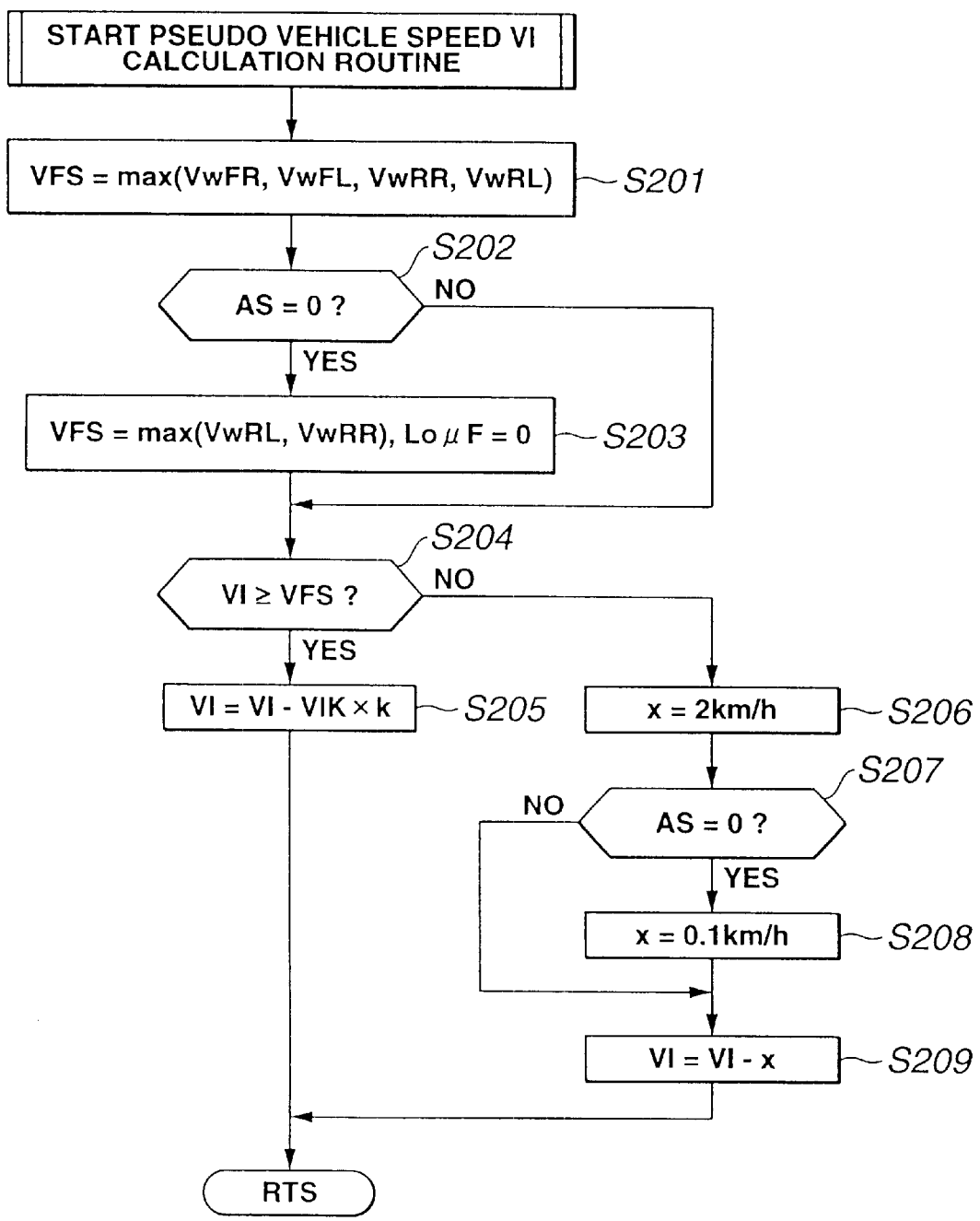
FIG. 5 is a flow chart showing a pseudo vehicle speed VI arithmetic calculation routine executed by the processor of the control unit of the ABS system of the embodiment.

Referring now to FIG. 5, there is shown the subroutine for pseudo vehicle speed VI calculation related to step S102 of FIG. 4.

At step S201, the highest one of the four wheel speeds, that is, VwFR, VwFL, VwRR, and VwRL is selected as a skid-control wheel speed VFS, by way of a so-called select-HIGH process VFS=max(VwFR, VwFL, VwRR, VwRL).

At step S202, a check is made to determine whether the anti-skid timer counted value AS is "0". In case of AS=0, that is, before execution of the pressure reduction control, step S203 occurs. Conversely in case of AS≠0, that is, after execution of the pressure reduction control, the subroutine jumps from step S202 to step S204.

At step S203, the previously-noted skid control wheel speed VFS is set at a higher one of the rear-left and rear-right wheel speeds VwRL and VwRR corresponding to driven road wheels of the front-wheel-drive vehicle. This is represented by the expression VFS=max(VwRL, VwRR). At the same time, at step S203, a low-$\mu$ road surface indicative flag Lo$\mu$F is reset (=0).

At step S204, a check is made to determine whether pseudo vehicle speed VI is greater than or equal to skid control wheel speed VFS. When VI=VFS, the subroutine proceeds from step S204 to step S205. At step S205, as appreciated from the following expression, the current value $VI_{(n)}$ of pseudo vehicle VI is calculated based on the vehicle deceleration VIK as the difference $(VI_{(n-1)}-VIK \times k)$ between the previous value $VI_{(n-1)}$ of pseudo vehicle speed VI and a product (VIK×k) of vehicle deceleration VIK and a coefficient k.

$$VI=VI-(VIK) \times k$$

where VI of the left side denotes the current value $VI_{(n)}$ of pseudo vehicle speed VI, while VI of the right side denotes the previous value $VI_{(n-1)}$ of pseudo vehicle speed VI.

Conversely when VI<VFS, that is, the answer to step S204 is in the negative (NO), the subroutine proceeds from step S204 to a series of steps S206–S209.

At step S206, a constant x used for arithmetic calculation executed at step S209 (described later) is set at a predetermined value such as 2 km/h.

At step S207, a check is made to determine whether the anti-skid timer counted value AS is "0". In case of AS=0, that is, before execution of the pressure reduction control, step S208 occurs. At step S208, the constant x is set at a predetermined small value such as 0.1 km/h. After step S208, or when the answer to step S207 is in the negative (NO), that is, AS≠0, in other words, after execution of the pressure reduction control, the subroutine proceeds to step S209. At step S209, the current value $VI_{(n)}$ of pseudo vehicle speed VI is calculated from the following expression.

$$VI=VI-x$$

where VI of the left side denotes the current value $VI_{(n)}$ of pseudo vehicle speed VI, while VI of the right side denotes the previous value $VI_{(n-1)}$ of pseudo vehicle speed VI.

As discussed previously in reference to the flow chart of FIG. 5, during the pressure reduction control, when wheel speed Vw is recovering to pseudo vehicle speed or thereafter when the wheel speed exceeds a point substantially corresponding to a so-called "spin-up point" or a "return-to-normal point", pseudo vehicle speed VI is calculated based on vehicle deceleration VIK (see the flow from step S204 to step S205). After this, when skid control wheel speed VFS exceeds pseudo vehicle speed VI owing to the recovery of wheel speed Vw to the actual vehicle speed by way of the pressure reduction control, that is, as soon as the condition defined by VFS>VI is satisfied, pseudo vehicle speed VI is calculated based on the predetermined constant x (see the flow from step S204 through steps S206, S207, and S208 to step S209), instead of the use of vehicle deceleration VIK. Step S208 functions as a limiter, which is effective when the value of skid control wheel speed VFS is excessively greater than the current value of pseudo vehicle speed VI. The previously discussed spin-up point corresponds to a speed value of the wheel speed (or the pseudo vehicle speed regarded as vehicle speed) calculated at the time when the wheel speed Vw changes from an increasing state to a decreasing state (in other words, the pseudo vehicle speed VI changes from an increasing state to a decreasing state) at each cycle of skid control and thus wheel speed Vw begins to separate from pseudo vehicle speed VI.

Figure 6:
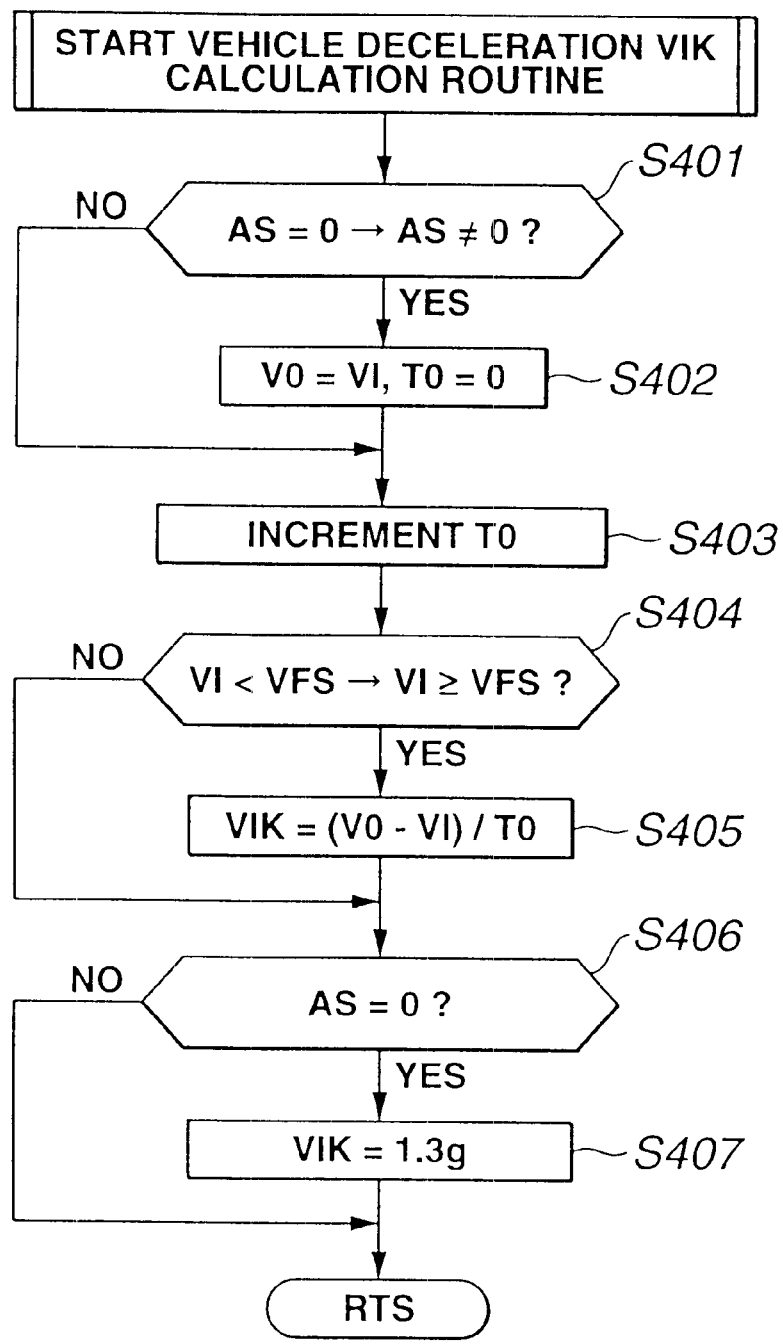
FIG. 6 is a flow chart showing a vehicle deceleration rate VIK arithmetic calculation routine executed by the processor of the control unit of the ABS system of the embodiment.

Referring now to FIG. 6, there is shown the subroutine for vehicle deceleration VIK calculation for step S103 of FIG. 4.

At step S401, a check is made to determine whether the anti-skid timer counted value AS is switched from a state of AS=0 to a state of AS≠0. Switching (AS=0→AS≠0) from the state of AS=0 to the state of AS≠0 means a starting point of the skid control. As soon as switching from AS=0 to AS≠0 occurs, that is, when the skid control is initiated, step S402 occurs. At step S402, the pseudo vehicle speed VI calculated at the current arithmetic-calculation cycle is set at an arithmetic-calculation reference value V0 needed for arithmetic calculation of vehicle deceleration VIK. At the same time, at step S402 an arithmetic-calculation reference timer T0 is reset (=0), and thereafter step S403 occurs. Conversely when switching from AS=0 to AS≠0 does not occur, that is, when the anti-skid timer counted value AS remains kept at "0" and thus the skid control is not initiated, the subroutine proceeds from step S401 to step S403.

At step S403, arithmetic-calculation reference timer T0 is incremented by "1".

At step S404, a check is made to determine whether switching (VI<VFS→VI≧VFS) from a state defined by an inequality VI<VFS to a state defined by an inequality VI≧VFS occurs. Such a switching point (VI<VFS→VI≧VFS) can be determined by detecting the previously discussed spin-up point that the pseudo vehicle speed changes from an increasing state to a decreasing state. In other words, step S404 determines whether the spin-up point occurs. In presence of switching from VI<VFS to VI≧VFS, that is, when the spin-up point occurs, the subroutine proceeds from step S404 to step S405. Conversely when the answer to step S404 is in the negative (NO), that is, when the spin-up point does not occur, the subroutine flows from step S404 to step S406.

At step S405, vehicle deceleration VIK is calculated based on pseudo vehicle speed VI and reference value V0, both given at the current cycle, and the counted value of reference timer T0 measured from the starting point of skid control, from the following expression.

$$VIK=(V0-VI)/T0$$

At step S406, a check is made to determine whether the anti-skid timer counted value AS is "0". When AS=0, the subroutine proceeds from step S406 to step S407. At step S407, vehicle deceleration VIK is set at 1.3 g. During the first cycle of skid control (at the early stage of skid control), wheel speed Vw is lower than the actual vehicle speed and thus the spin-up point does not occur. For this reason, at the beginning of skid control, the ABS system cannot yet execute the arithmetic calculation for vehicle deceleration VIK based on the expression VIK=(V0−VI)/T0 via step S405. Therefore, in case of AS=0, the predetermined fixed value such as 1.3 g suitable to braking on a high-$\mu$ road surface, is used as the vehicle deceleration VIK until such time that the spin-up point has been detected and thus the arithmetic calculation for vehicle deceleration VIK has been enabled via step S405.

Figure 7:
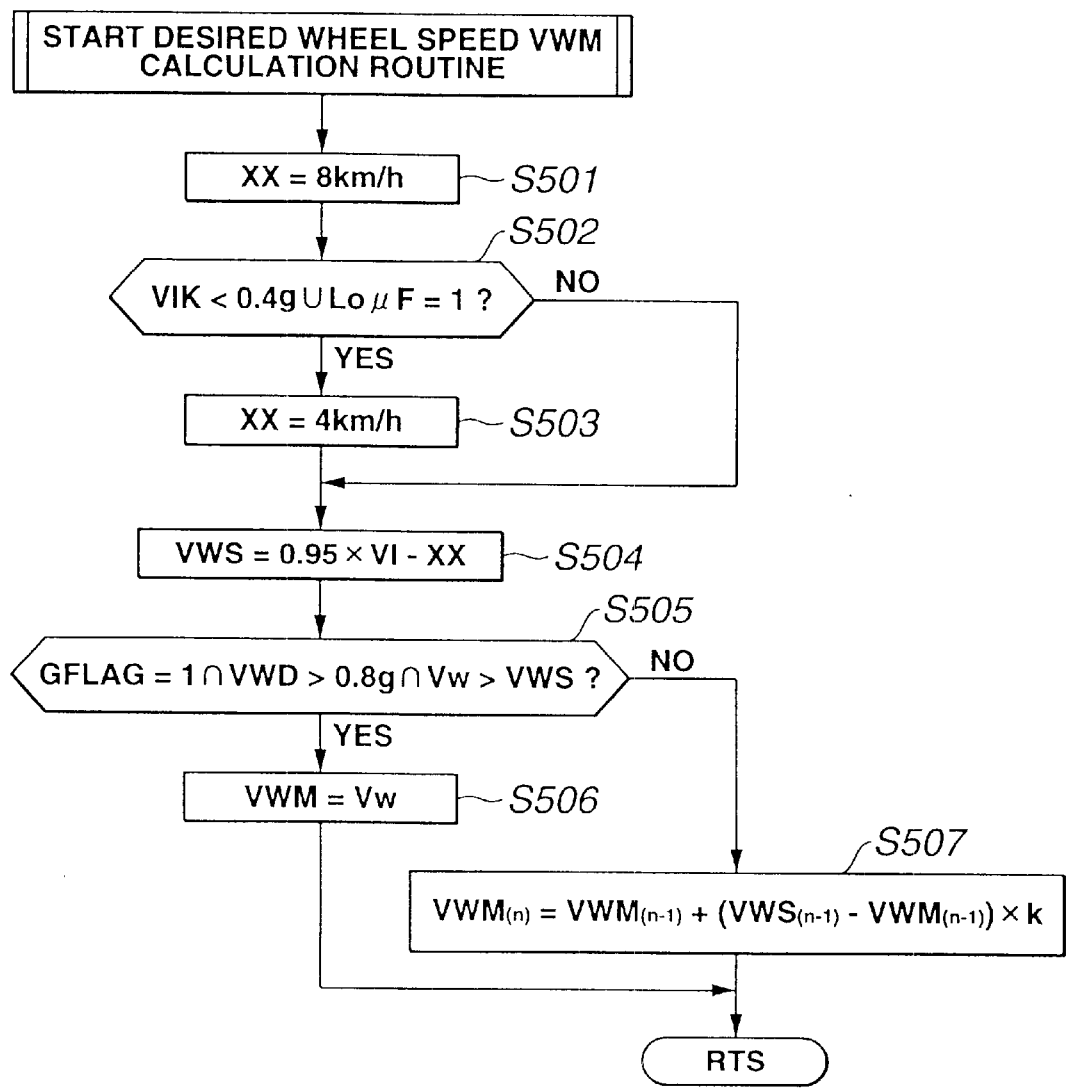
FIG. 7 is a flow chart showing a desired wheel speed VWM arithmetic calculation routine executed by the processor of the control unit of the ABS system of the embodiment.

Referring now to FIG. 7, there is shown the subroutine for desired wheel speed VMW calculation related to step S104 of FIG. 4.

At step S501, a constant xx is set at 8 km/h.

At step S502, a check is made to determine whether either of a first condition that vehicle deceleration VIK is less than 0.4 g and a second condition that low-$\mu$ road surface indicative flag Lo$\mu$F is set at "1" is satisfied. When the answer to step S502 is in the affirmative (YES), that is, the condition defined by a logical expression VIK<0.4 g∪Lo$\mu$F=1 is satisfied, the ABS system estimates or determines that the current road surface condition is a low-$\mu$ road condition. Thus, the subroutine proceeds from step S502 to step S503. At step S503, the ABS system decreasingly compensates for the constant xx such that constant xx is set at 4 km/h. After this, step S504 occurs. When the answer to step S502 is negative (NO), that is, the condition defined by the expression VIK<0.4 g∪Lo$\mu$F=1 is unsatisfied, the ABS system estimates or determines that the current road surface condition is not a low-$\mu$ road condition. Thus, the subroutine jumps from step S502 to step S504, without changing the constant xx.

At step S504, optimum slip ratio value VWS is calculated based on the current value of pseudo vehicle speed VI and the constant xx from the following expression.

$$VWS = 0.95 \times VI - xx$$

The optimum slip ratio value (optimum-slip-ratio wheel-speed value) VWS indicates a wheel speed value corresponding to an optimum slip ratio that provides maximum effective braking with respect to the current pseudo vehicle speed.

At step S505, a check is made to determine whether a first condition that pressure reduction flag GFLAG is set at "1" (during the pressure reduction control), a second condition that wheel acceleration VWD is greater than 0.8 g, and a third condition that wheel speed Vw is greater than optimum slip ratio value VWS are all satisfied. When the answer to step S505 is in the affirmative (YES), that is, the condition defined by the logical expression GFLAG=1∪VWD>0.8 g∪Vw>VWS is satisfied, the subroutine proceeds from step S505 to step S506. At step S506, desired wheel speed VWM is set at the wheel speed Vw. Conversely when the answer to step S505 is in the negative (NO), that is, the condition defined by the logical expression GFLAG=1∪VWD>0.8 g∪Vw>VWS is unsatisfied, the subroutine proceeds from step S505 to step S507. At step S507, by using a first-order lag low-pass filter, desired wheel speed VWM is calculated from the following expression.

$$VWM_{(n)} = VWM_{(n-1)} + (VWS_{(n-1)} - VWM_{(n-1)}) \times k$$

where $VWM_{(n)}$ denotes the current value of desired wheel speed VWM, $VWM_{(n-1)}$ denotes the previous value of desired wheel speed VWM, that is, the desired wheel speed value calculated one cycle before, $VWS_{(n-1)}$ denotes the previous value of optimum slip ratio value VWS, that is, the optimum slip ratio value calculated one cycle before, and k denotes a coefficient.

As can be appreciated from the subroutine of FIG. 7, in particular, switching from the flow from step S505 to step S506 to the flow from step S505 to step S507, and as will be fully described later in reference to the time charts shown in FIGS. 11A–11E, in the ABS system of the embodiment, desired wheel speed VWM is set at the wheel speed Vw when wheel speed Vw returns to the actual vehicle speed at the wheel acceleration VWD greater than 0.8 g after execution of the pressure reduction control (see the flow from step S505 to step S506). From the time when wheel speed Vw approaches to the actual vehicle speed and then the wheel speed reaches a speed value close to the spin-up point, desired wheel speed VWM is converged to optimum slip ratio value VWS with a time-lag of first order (see the flow from step S505 to step S507).

Figure 8:
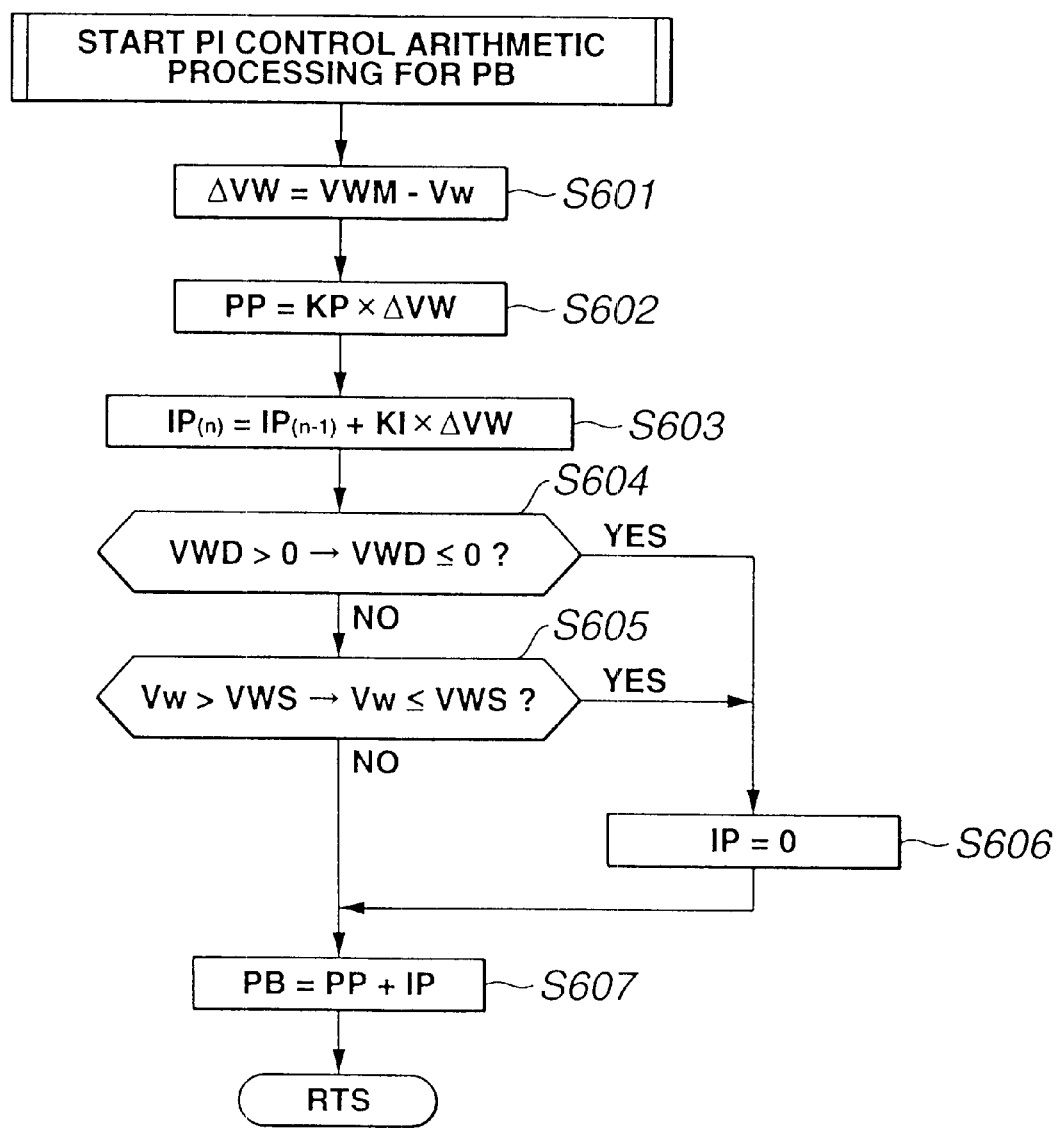
FIG. 8 is a flow chart showing a PI control routine executed by the processor of the control unit of the ABS system of the embodiment.

Referring now to FIG. 8, there is shown the subroutine for PI control arithmetic processing used to derive desired brake-fluid pressure PB (see step S105 of FIG. 4).

At step S601, a wheel-speed deviation $\Delta$VW (=VWM-Vw) is calculated based on desired wheel speed VWM and wheel speed Vw.

At step S602, in a deviation equivalent pressure value PP (=KP×$\Delta$VW) is calculated by multiplying wheel-speed deviation $\Delta$VW by a proportional gain or a conversion factor KP, for conversion of the deviation $\Delta$VW into a brake-fluid pressure value. Deviation equivalent pressure value PP (=KP×$\Delta$VW) corresponds to the proportional term for the PI feedback control.

At step S603, an integrated pressure value IP is calculated from the following expression. Integrated pressure value IP corresponds to the integrating term for the PI feedback control, that is, the integrated value of wheel-speed deviation $\Delta$VW.

$$IP_{(n)} = IP_{(n-1)} + KI \times \Delta VW$$

where $IP_{(n)}$ denotes the current value of integrated pressure value IP, KI denotes a proportional gain, $IP_{(n-1)}$ denotes the previous value of integrated pressure value IP, that is, the integrated pressure value calculated one cycle before, and $\Delta$VW denotes the wheel-speed deviation.

At step S604, a check is made to determine whether the wheel acceleration VWD is switched from a state of VWD>0 to a state of VWD$\leq$0. When switching (VWD>0→VWD$\leq$0) from the state of VWD>0 to the state of VWD=0 occurs, the subroutine flows from step S604 to step S606. Conversely when switching (VWD>0→VWD$\leq$0) from the state of VWD>0 to the state of VWD$\leq$0 does not occur, the subroutine flows from step S604 to step S605.

At step S605, a check is made to determine whether wheel speed Vw is switched from a state of Vw>VWS to a state of Vw$\leq$VWS. When switching (Vw>VWS→Vw$\leq$VWS) from the state of Vw>VWS to the state of Vw$\leq$VWS occurs, the subroutine flows from step S605 to step S606. Conversely when switching (Vw>VWS→Vw$\leq$VWS) from the state of Vw>VWS to the state of Vw$\leq$VWS does not occur, the subroutine flows from step S605 to step S607.

At step S606, the integrated pressure value IP is set at "0", and thereafter the subroutine proceeds to step S607.

At step S607, desired brake-fluid pressure PB is calculated from the following expression.

$$PB = PP + IP$$

As can be appreciated from the above expression, in the system of the embodiment, the system output is obtained as the sum of the proportional term (i.e., PP) and the integrating term (i.e., PI) with the adjustable gain (KP, KI) for each term. The negative desired brake-fluid pressure PB means pressure build-up, whereas the positive desired brake-fluid pressure PB means pressure reduction.

Figure 9:
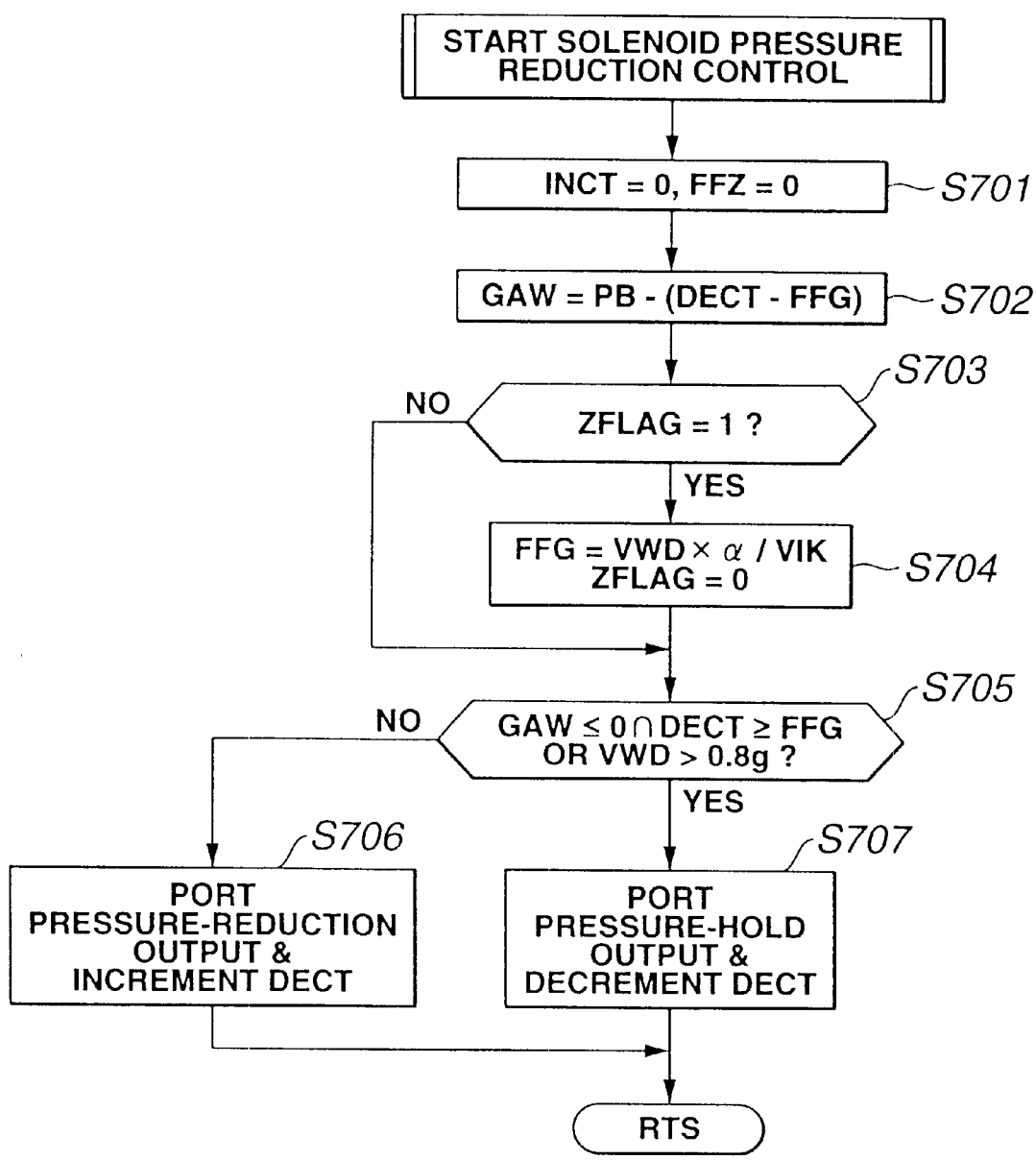
FIG. 9 is a flow chart showing the solenoid pressure reduction control.

Referring now to FIG. 9, there is shown the solenoid pressure reduction control routine related to step S109 of FIG. 4.

At step S701, the pressure build-up timer counted value INCT is cleared to "0". At the same time, the feed-forward pressure build-up controlled variable FFZ is reset to "0".

At step S702, a pressure reduction time GAW corresponding to the ON pulse width is calculated from the following expression.

$$GAW = PB - (DECT - FFG)$$

where PB denotes the current value of desired brake-fluid pressure, DECT denotes the pressure reduction timer counted value, and FFG denotes the feed-forward pressure reduction controlled variable.

At step S703, a check is made to determine whether pressure build-up flag ZFLAG is set (=1). In other words, a check is made to determine or discriminate whether this cycle is the first pressure reduction control cycle. If pressure build-up flag ZFLAG is still set and thus the current cycle is the first pressure reduction cycle, the subroutine proceeds from step S703 to step S704. Conversely when ZFLAG≠1, the subroutine jumps from step S703 to step S705 without executing the procedure of step S704.

At step S704, feed-forward pressure reduction controlled variable FFG is calculated from the following expression.

$$FFG = VWD \times \alpha / VIK$$

where VWD denotes the wheel acceleration, α denotes a conversion factor, and VIK denotes the vehicle deceleration.

At the same time, at step S704, pressure build-up flag ZFLAG is reset (=0). As appreciated from the expression (FFG=VWD×α/VIK) of step S704, the feed-forward pressure reduction controlled variable needed at the initial stage of the pressure reduction control, that is, during the first or initial pressure reduction operating mode, is calculated based on wheel acceleration VWD.

At step S705, a check is made to determine whether either of (i) a first condition that pressure reduction time GAW is less than or equal to "0" and pressure reduction timer counted value DECT is greater than or equal to feed-forward pressure reduction controlled variable FFG and (ii) a second condition that wheel acceleration VWD is greater than 0.8 g is satisfied. When the answer to step S705 is affirmative (YES), that is, when GAW≦0∩DECT≧FFG OR VWD>0.8 g, the subroutine proceeds from step S705 to step S707. At step S707, the ABS system generates a port pressure-hold control signal to perform the pressure hold operating mode, and additionally pressure reduction timer counted value DECT is decremented. Conversely when the first condition defined by GAW≧0∩DECT≧AFFG and the second condition defined by VWD>0.8 g are both unsatisfied, the subroutine proceeds from step S705 to step S706. At step S706, the ABS system generates a port pressure-reduction control signal to perform the pressure reduction operating mode, and additionally pressure reduction timer counted value DECT is incremented. That is, during the pressure reduction control, in particular, at the early stage of pressure reduction control, the ABS system generates the port pressure-reduction control signal until such time that pressure reduction timer counted value DECT has exceeded feed-forward pressure reduction controlled variable FFG. In the middle of the pressure reduction control, or after the pressure reduction control, when wheel acceleration VWD becomes greater than 0.8 g and thus the wheel speed is recovering to the actual vehicle speed, the ABS system terminates the output of the port pressure-reduction control signal. In lieu thereof, the system initiates the output of the port pressure-hold control signal. As described later, after execution of the initial output of feed-forward pressure reduction controlled variable FFG, actually, the output signal corresponding to the difference between the current value $PB_{(n)}$ of desired brake-fluid pressure PB and the previous value $PB_{(n-1)}$ calculated one cycle before is generated from skid control unit 12.

Figure 10:
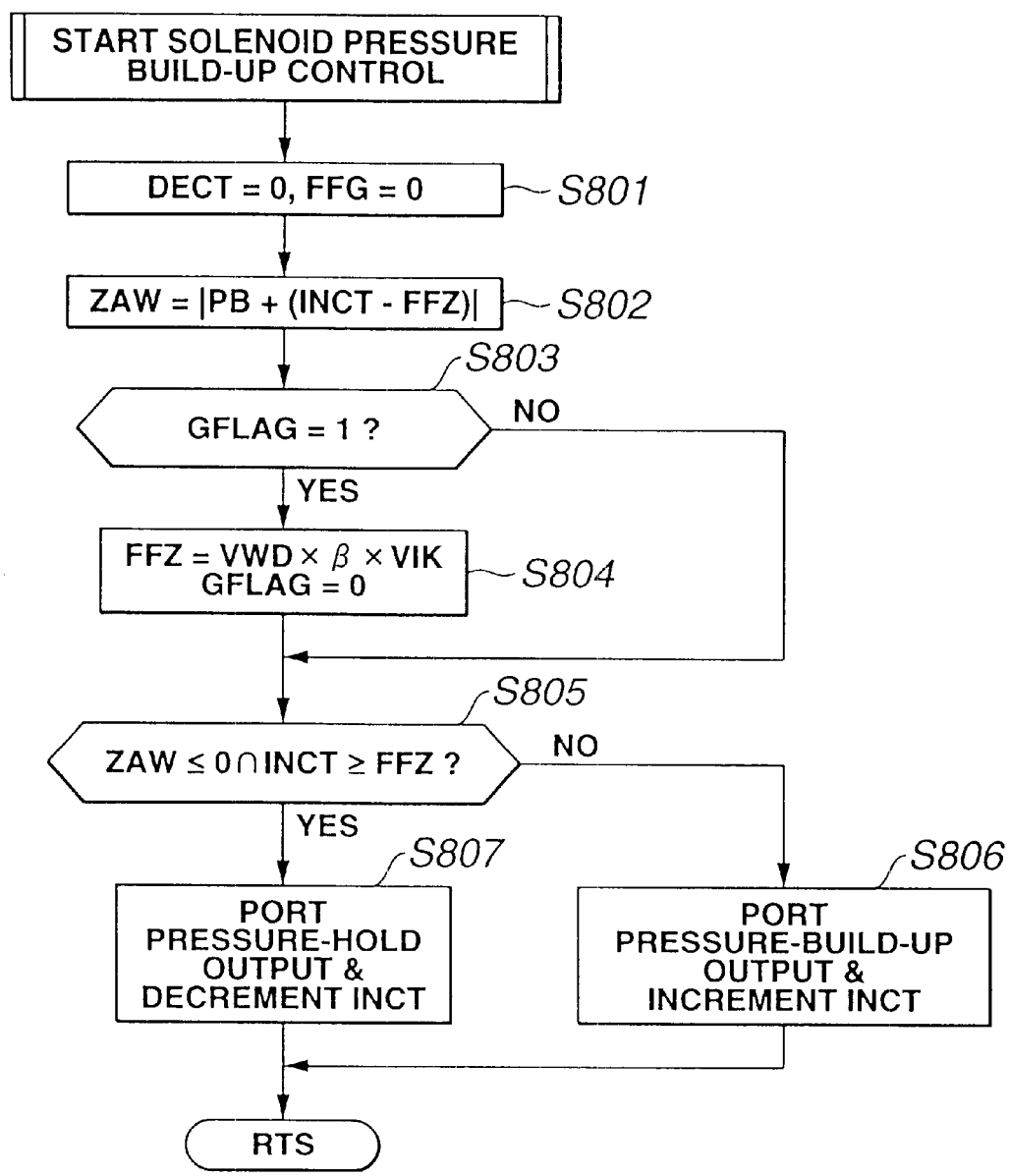
FIG. 10 is a flow chart showing the solenoid pressure build-up control.
Figures 11A, 11B, 11C, 11D, 11E:
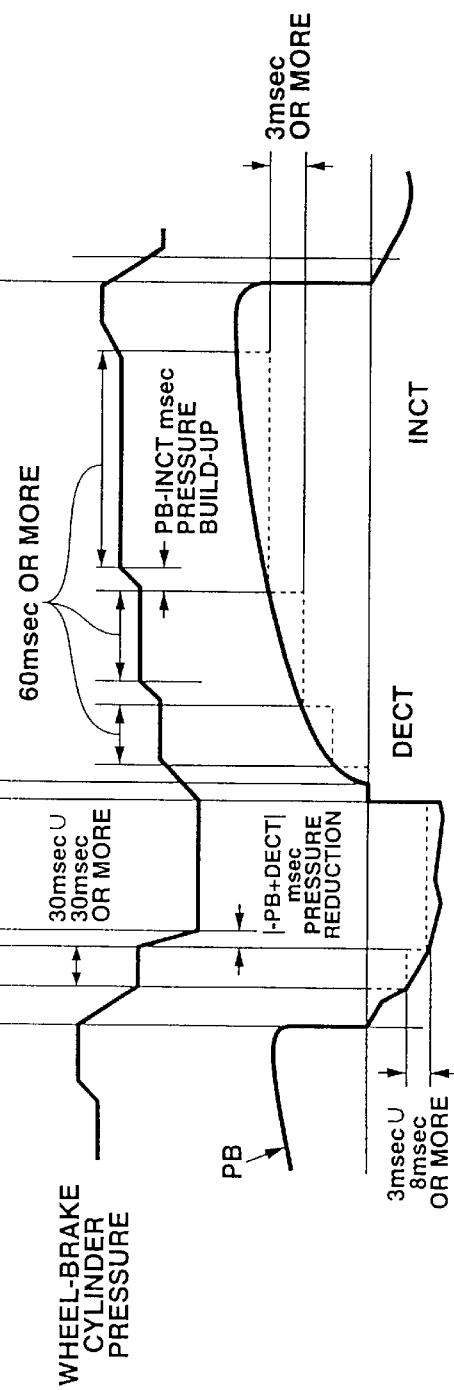
FIGS. 11A, 11B, 11C, 11D and 11E are time charts showing variations in a pressure reduction flag GFLAG, a pressure build-up flag ZFLAG, a pseudo vehicle speed VI, a desired wheel speed VWM, a wheel speed Vw, an optimum slip ratio value VWS, a wheel-speed deviation ΔVW, a wheel-brake cylinder pressure, and a desired brake fluid pressure PB, obtained by the ABS system of the embodiment during skid control.

Referring now to FIG. 10, there is shown the solenoid pressure build-up control routine related to step S111 of FIG. 4.

At step S801, the pressure reduction timer counted value DECT is cleared to "0". At the same time, the feed-forward pressure reduction controlled variable FFG is reset to "0".

At step S802, a pressure build-up time ZAW corresponding to the ON pulse width is calculated from the following expression.

$$ZAW = |PB + (INCT - FFZ)|$$

where PB denotes the current value of desired brake-fluid pressure, INCT denotes the pressure build-up timer counted value, and FFZ denotes the feed-forward pressure build-up controlled variable.

At step S803, a check is made to determine whether pressure reduction flag GFLAG is set (=1). In other words, a check is made to determine or discriminate whether this cycle is the first pressure build-up control cycle. If pressure reduction flag GFLAG is still set and thus the current cycle is the first pressure build-up cycle, the subroutine proceeds from step S803 to step S804. Conversely when GFLAG≠1, the subroutine jumps from step S803 to step S805, bypassing step S804.

At step S804, feed-forward pressure build-up controlled variable FFZ is calculated from the following expression.

$$FFZ = VWD \times \beta \times VIK$$

where VWD denotes the wheel acceleration, β denotes a conversion factor, and VIK denotes the vehicle deceleration.

At the same time, at step S804, pressure reduction flag GFLAG is reset (=0). As appreciated from the expression (FFZ=VWD×β×VIK) of step S804, the feed-forward pressure build-up controlled variable needed at the initial stage of the pressure reduction control is calculated based on wheel acceleration VWD.

At step S805, a check is made to determine whether a condition that pressure build-up time ZAW is less than or equal to "0" and pressure build-up timer counted value INCT is greater than or equal to feed-forward pressure build-up controlled variable FFZ is satisfied. When the answer to step S805 is affirmative (YES), that is, when ZAW≦0∩INCT≧FFZ, the subroutine proceeds from step S805 to step S807. At step S807, the ABS system generates a port pressure-hold control signal to perform the pressure hold operating mode, and additionally pressure build-up timer counted value INCT is decremented. Conversely when the condition defined by ZAW≦0∩INCT≧FFZ is unsatisfied, the subroutine proceeds from step S805 to step S806. At step S806, the ABS system generates a port pressure build-up control signal to perform the pressure build-up operating mode, and additionally pressure build-up timer counted value INCT is incremented. That is, during the pressure build-up control, in particular, at the early stage of pressure build-up control, the ABS system generates the port pressure build-up control signal until such time that pressure build-up timer counted value INCT has exceeded feed-forward pressure build-up controlled variable FFZ. Thereafter, as soon as pressure build-up time ZAW becomes positive, the ABS system terminates the output of the port pressure build-up control signal. In lieu thereof, the system initiates the output of the port pressure-hold control signal. As described later, after execution of the initial output of feed-forward pressure build-up controlled variable FFZ, actually, the output signal corresponding to the difference between the current value $PB_{(n)}$ of desired brake-fluid pressure PB and the previous value $PB_{(n-1)}$ calculated one cycle before is generated from skid control unit 12.

Figure 1:
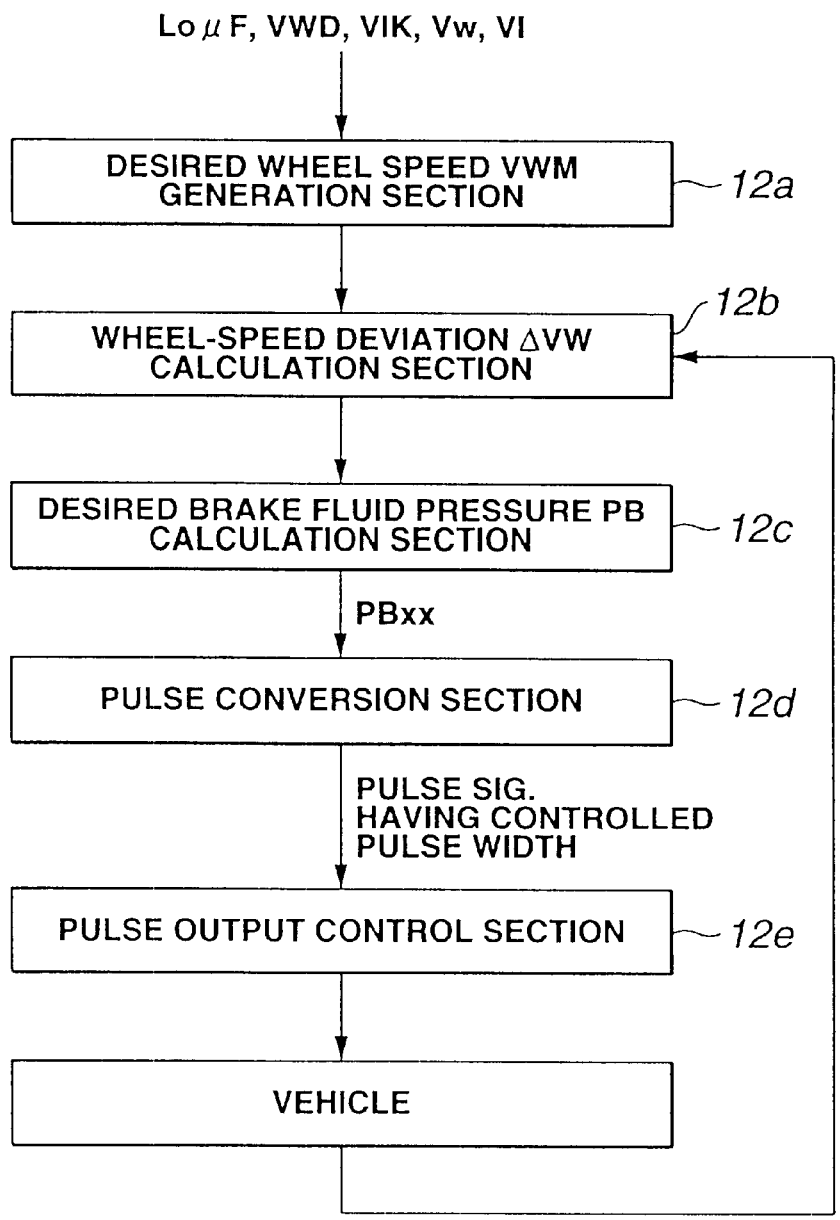
FIG. 1 is a block diagram showing essential parts of one embodiment of an anti-skid control system.

Referring now to FIG. 1, there is shown the block diagram briefly indicating various data-processing sections of the processor of skid control unit 12 incorporated in the antiskid control system of the embodiment.

During execution of the skid control routine of FIG. 4, first, a desired wheel speed VWM generation section (desired wheel speed VWM generation means) 12a receives input information, namely pseudo vehicle speed VI, vehicle deceleration VIK, wheel speed Vw, wheel acceleration VWD, and low-$\mu$ road surface indicative flag Lo$\mu$F, and generates or produces desired wheel speed VWM based on these input informational data. That is, desired wheel speed VWM generation section 12a performs the processing corresponding to step S104 of FIG. 4. Actually, desired wheel speed VWM generation section 12a is comprised of a first-order low-pass filter (exactly, a first-order lag low-pass filter). Thus, the desired wheel speed is gradually converged toward the optimum-slip-ratio wheel-speed value with a time lag of first order by way of the first-order low-pass filtering process. The desired wheel speed VWM generated by desired wheel speed VWM generation section 12a is input into a wheel-speed deviation $\Delta$VW calculation section (wheel-speed deviation $\Delta$VW calculation means) 12b to produce wheel-speed deviation $\Delta$VW. That is, wheel-speed deviation $\Delta$VW calculation section 12b performs the processing corresponding to step S601 of FIG. 8. After this, within a desired brake-fluid pressure PB calculation section (desired brake-fluid pressure PB calculation means) 12c, both of deviation equivalent pressure value PP (=KP×$\Delta$VW) and integrated pressure value IP (=IP$_{(n-1)}$+KI×$\Delta$VW) are calculated based on wheel-speed deviation $\Delta$VW from calculation section 12b, and then calculates desired brake-fluid pressure PB based on these pressure values PP (the proportional term) and PI (the integrating term). That is, desired brake-fluid pressure PB calculation section 12c performs the processing corresponding to steps S602–S607 of FIG. 8. In FIG. 1, PBxx represents the desired brake-fluid pressure for the wheel-brake cylinder, which is subjected to skid control, of the front-right, front-left, rear-left, and rear-right wheel cylinders W/CFR, W/CFL, W/CRL, W/CRR. The desired brake-fluid pressure PB is input into a pulse conversion section (pulse conversion means) or a controlled ON pulse width setting section (controlled ON pulse width setting means) 12d, and converted into a pulse signal having a controlled ON pulse width via the pulse conversion section. That is, pulse conversion section or controlled ON pulse width setting section 12d sets or determines the controlled ON pulse width based on the desired brake-fluid pressure. Thereafter, the pulse signal having the controlled pulse width is output via a pulse output control section (pulse output control means) 12e to the solenoid valve, at a time when the controlled pulse width exceeds a preset pulse width such as preferably 2–8 milliseconds, serving as a threshold value used for determining initiation of the solenoid control signal output.

That is, pulse conversion section 12d and pulse output control section 12e perform the processing corresponding to steps S106–S119 of FIG. 4. In this manner, during the solenoid pressure reduction control (see FIG. 9), a pulse signal or a duty cycle signal or a drive signal or a pulse width modulated voltage signal having a controlled ON pulse width corresponding to pressure reduction time GAW based on desired brake-fluid pressure PB is output from the skid control unit. In a similar manner, during the solenoid pressure build-up control (see FIG. 10), a pulse signal or a duty cycle signal having a controlled ON pulse width corresponding to pressure build-up time ZAW based on desired brake-fluid pressure PB is output from the skid control unit.

The operation of the anti-skid control system of the embodiment is hereunder described in detail in reference to the time charts of FIGS. 11A–11E.

As can be seen from the time charts, desired wheel speed VWM is produced in a manner so as to be converged from a speed value equivalent to wheel speed Vw, that is, the wheel speed near the spin-up point, to optimum slip ratio value VWS, in accordance with a decrease in pseudo vehicle speed VI during braking.

At the early stages of the skid control (see a time period (t1–t4) of the time charts), the first pressure reduction control, the subsequent pressure hold control, and the second pressure reduction control are executed as discussed hereunder. At the time t1 when wheel speed Vw becomes less than optimum slip ratio value VWS under a condition that skid control is not initiated, the routine of FIG. 4 flows from step S106 via step S107 to step S109, so as to execute the pressure reduction control. At the first execution cycle of the pressure reduction control routine, the subroutine of FIG. 9 flows from step S701 through steps S702 and S703 to step S704, and as a result feed-forward pressure reduction controlled variable FFG is determined based on wheel acceleration VWD and vehicle deceleration VIK. Thereafter, owing to the flow from step S705 to step S706, the ABS system generates the port pressure-reduction control signal and performs the pressure reduction operating mode. The output of the port pressure-reduction control signal is continuously executed until such time that pressure reduction timer counted value DECT reaches feed-forward pressure reduction controlled variable FFG. As can be seen from the time charts, pressure reduction timer counted value DECT actually reaches feed-forward pressure reduction controlled variable FFG at the time t2. Thus, from the time t2, the skid control routine of FIG. 4 flows from step S106 through steps S108 and S110 to step S113, such that the ABS system generates the port pressure-hold control signal and performs the pressure hold operating mode. After t2, if there is the wheel-speed deviation $\Delta$VW (=VWM−Vw) between desired wheel speed VWM and wheel speed Vw, desired brake-fluid pressure PB that is obtained by the operation of multiplication of wheel-speed deviation $\Delta$VW (see the expression PP=KP×$\Delta$VW at step S602, the expression IP$_{(n)}$=IP$_{(n-1)}$+KI×$\Delta$VW at step S603 and the expression PB=PP+IP at step S607) tends to increase by way of the PI control (proportional plus integral control) arithmetic processing of step S105 of FIG. 4. Thereafter, if a value obtained by subtracting feed-forward pressure reduction controlled variable FFG from desired brake-fluid pressure PB, in other words, the valve-opening time period of pressure reduction valve 6 corresponding to desired brake-fluid pressure PB, exceeds 8 milliseconds at a time to which the pressure hold control has been executed for 30 milliseconds from t2, or if the value obtained by subtracting feed-forward pressure reduction controlled variable FFG from the valve-opening time period of pressure reduction valve 6 corresponding to desired brake-fluid pressure PB exceeds 8 milliseconds (corresponding to a preset pulse width) at a time to which the pressure hold control has been executed for a time duration ranging from 30 milliseconds to 60 milliseconds from t2, the ABS system generates the pressure-reduction control signal to perform the pressure reduction operating mode. The time duration ranging from 30 milliseconds to 60 milliseconds serves as a criterion for determining whether the controlled ON pulse width of the next pressure reduction control signal to be output to the pressure reduction valve 6 exceeds the preset pulse width (8 milliseconds) at the time when an elapsed time longer than a time duration ranging 30 milliseconds through 60 milliseconds has expired from the previous pressure reduction control signal output. Alternatively, if the value obtained by subtracting feed-forward pressure reduction controlled variable FFG from the valve-opening time period of pressure reduction valve 6 corresponding to desired brake-fluid pressure PB exceeds 3 milliseconds at a time when the pressure hold control continuously executed for 60 milliseconds from t2 terminates, or thereafter exceeds 3 milliseconds, the ABS system generates the pressure-reduction control signal to perform the pressure reduction operating mode (see the flow from step S108 via step S107 to step S109 in FIG. 4). The output of the pressure-reduction control signal is dependent upon the pressure reduction time GAW calculated based on desired brake-fluid pressure PB (see step S702 of FIG. 9). In the time charts of FIGS. 11A–11F, the pressure-reduction control signal is output for a period of time between t3 and t4. The output corresponds to a control signal output for moderate pressure reduction control. As appreciated from the above, the pressure reduction control signal output (exactly, the moderate pressure reduction control signal output) at the second execution cycle of the pressure reduction control or a later pressure-reduction-control execution cycle is initiated after at least 30 milliseconds have expired from the first pressure reduction control signal output. In this case, as discussed previously, the pressure reduction control signal output is initiated when pressure reduction time GAW exceeds 8 milliseconds (see the inequality of step S108 of FIG. 4, GAW=PB−(DECT−FFG)>8 msec). If an elapsed time measured from the first pressure reduction control signal output exceeds 30 milliseconds but not yet reach 60 milliseconds, the second pressure reduction control signal output is initiated when pressure reduction time GAW exceeds 8 milliseconds. Alternatively, in case of pressure reduction time GAW is a comparatively small, the second pressure reduction control signal output is initiated when pressure reduction time GAW exceeds 3 milliseconds after 60 milliseconds have expired from the first pressure reduction control signal output.

As set forth above, according to the anti-skid control system of the embodiment, when initiating the moderate pressure reduction control, first, desired brake-fluid pressure PB is calculated or computed by way of the PI control arithmetic processing based on wheel-speed deviation ΔVW (=VWM−Vw) between desired wheel speed VWM with a time-lag of first order and wheel speed Vw. Second, the moderate pressure reduction control signal output is inhibited until such time that desired brake-fluid pressure PB reaches a predetermined value (see step S108 of FIG. 4). In other words, the moderate pressure reduction control signal output is initiated when desired brake-fluid pressure PB reaches the predetermined value, thereby effectively reducing a tendency for the wheel-brake cylinder pressure of the road wheel subjected to skid control to overshoot the desired value or preventing the occurrence of undesired overshooting or undesired control hunting. As a result, a wasteful amount of work of the ABS pump or the return pump can be reduced, thus eliminating the necessity of a large-capacity of ABS pump. Additionally, there is a tendency for the frequency of skid control to fluctuate, thus reducing undesired noises and vibrations during operation of the ABS system. If the skid control frequency is not variable but fixed to a predetermined constant value, undesired resonance occurs, thus increasing undesired noises and vibrations. Moreover, in the system of the embodiment, there is a predetermined minimum time interval, such as at least 30 milliseconds, between the first and second feed-forward pressure reduction control signal outputs. That is to say, the predetermined minimum time interval (at least 30 milliseconds) always exists between two adjacent execution cycles of the pressure reduction control operating mode. Therefore, the ABS system of the embodiment avoids a lack of pressure reduction at the wheel-brake cylinder of the road wheel subjected to skid control, even when a so-called $\mu$-jump or $\mu$-change that a friction factor of the road surface changes from high to low occurs, while efficiently suppressing the frequency of executions of the pressure reduction control. This reduces the frequency of executions of the pressure reduction control, thus reducing the design capacity of the ABS pump, and enhances the convergence to desired brake-fluid pressure PB.

After the second pressure reduction control terminates, the pressure build-up control is initiated from the time t5. At t5, when wheel speed Vw exceeds optimum slip ratio value VWS and additionally wheel acceleration VWD exceeds 0.8 g and rapidly increases and recovers toward pseudo vehicle speed VI, the condition defined by the logical expression GFLAG=1∪VWD>0.8 g∪Vw>VWS is satisfied (see step S505 of FIG. 7). Therefore, desired wheel speed VWM is set at wheel speed Vw. Thereafter, when the spin-up point is reached at the time t6, desired wheel speed VWM begins to gradually converge toward optimum slip ratio value VWS. On the other hand, desired brake-fluid pressure PB, which is obtained by the operation of multiplication of wheel-speed deviation ΔVW (see FIG. 8), tends to increase by way of the PI control (proportional plus integral control) arithmetic processing of step S105 of FIG. 4. Thus, the skid control routine of FIG. 4 flows from step S110 to step S111, such that the ABS system generates the port pressure-build-up control signal and performs the pressure build-up operating mode. At the first execution cycle of the pressure build-up control routine, the subroutine of FIG. 10 flows from step S801 through steps S802 and S803 to step S804. As a result, feed-forward pressure build-up controlled variable FFZ is determined based on both the wheel acceleration VWD and vehicle deceleration VIK, so as to execute the feed-forward pressure build-up control based on feed-forward pressure build-up controlled variable FFZ (see the time interval between t6 and t7). After this, during a time period between t7 and t8, the moderate pressure build-up operating mode is executed by way of the PI (proportional plus integral) feedback control. In this case, the moderate pressure build-up control signal output is initiated each time desired brake-fluid pressure PB (in other words, the valve-opening time period of pressure build-up valve 5 corresponding to desired brake-fluid pressure PB) computed by way of the PI feedback control arithmetic processing (see FIG. 8) based on wheel-speed deviation ΔVW (=VWM−Vw) exceeds a predetermined value (equivalent to 3 milliseconds). In the system of the shown embodiment, wheel-speed difference ΔVW decreases each time the moderate pressure build-up control signal output occurs. Thus, a timing that desired brake-fluid pressure PB (exactly, the valve-opening time period of pressure build-up valve 5 corresponding to desired brake-fluid pressure PB) reaches 3 milliseconds tends to gradually retard with the lapse of time. As a result, a time interval between two adjacent moderate pressure build-up control signal outputs tends to increase or widen. The previously discussed time interval such as 3 milliseconds is determined or designed in such a manner as to reliably smoothly permit brake fluid to be fed via the pressure build-up valve to the wheel-brake cylinder subjected to skid control at the pressure build-up operating mode, even when the coefficient of viscosity of brake fluid is high, for example during cold-weather driving. Also, the predetermined interval such as 3 milliseconds is determined or designed, taking into account a time interval that ensures the stable supply of brake fluid without noises and vibrations. The predetermined time interval (threshold value), such as 3 milliseconds or 8 milliseconds, used for comparison to the valve-opening time period of pressure reduction valve 6 corresponding to desired brake-fluid pressure PB for determining initiation of the pressure reduction control signal output, and the predetermined time interval (threshold value), such as 3 milliseconds, used for comparison to the valve-opening time period of pressure build-up valve 5 corresponding to desired brake-fluid pressure PB for determining initiation of the pressure build-up control signal output, are not limited to 3 milliseconds or 8 milliseconds. Taking into account a balance between a minimum valve opening time period contained within a first range that ensures the smooth reliable brake-fluid supply under a cold-weather driving condition (under a condition of brake fluid having a high viscosity) and a maximum valve opening time period contained within a second range that there is a less occurrence of noise and vibration, the predetermined time interval (threshold value) for comparison can be varied depending on characteristics of the brake system. It is more preferable that the predetermined time interval (threshold value) for comparison is set at a time interval ranging from 2 milliseconds to 8 milliseconds.

As will be appreciated from the above, in the anti-skid control system of the embodiment, after execution of the feed-forward pressure build-up control operating mode, the moderate pressure build-up control signal output is initiated each time the valve-opening time period of pressure build-up valve 5 corresponding to desired brake-fluid pressure PB produced based on the wheel-speed deviation $\Delta$VW between desired wheel speed VWM with the time-lag of first order and wheel speed Vw reaches the predetermined value such as 3 milliseconds. Therefore, there is a decreased tendency for overshooting to occur or there is no overshooting during the moderate pressure build-up operating mode, thereby efficiently reducing the brake fluid consumption and consequently reducing the design capacity of the ABS pump. Additionally, there is a tendency for the frequency of skid control to fluctuate, and also a rate of change in the brake-fluid pressure at one moderate pressure build-up control cycle tends to be effectively reduced, thus reducing undesired noises and vibrations during skid control. Furthermore, owing to the moderate pressure build-up control signal output initiated each time the valve-opening time period of pressure build-up valve 5 corresponding to desired brake-fluid pressure PB reaches the predetermined value such as 3 milliseconds, the pressure build-up control is executed such that the wheel-brake cylinder pressure is moderately converged toward the desired brake-fluid pressure. As a result, the pressure build-up time tends to increase or lengthen. Thus, it takes a comparatively long time until the next pressure reduction control is initiated. This effectively reduces the frequency of executions of the pressure reduction control and suppresses the degree of pressure reduction, and consequently reduces the design capacity of the ABS pump, thus reducing total manufacturing costs and weight of the ABS system. Additionally, the magnitude of the moderate pressure build-up control signal output, which is initiated each time the valve-opening time period of pressure build-up valve 5 corresponding to desired brake-fluid pressure PB reaches the predetermined value such as 3 milliseconds, is dependent on the pressure value of desired brake fluid pressure PB. In other words, there is no limitation to the magnitude of the moderate pressure build-up control signal output. Therefore, even in the event that the pressure value of desired brake-fluid pressure PB rapidly rises owing to the $\mu$-jump road surface condition that a transition from a low-$\mu$ road to a high-$\mu$ road occurs, the ABS system of the embodiment can generate the pressure build-up control signal output whose signal value is properly increasingly compensated for depending on a change (a rapid rise) in desired brake-fluid pressure PB. Briefly speaking, in the ABS system of the embodiment, inexpensive electromagnetic solenoid valves (pressure build-up valve 5 and pressure reduction valve 6) capable of controlling a wheel-brake cylinder pressure by on/off reaction of these solenoid valves are used. A relatively expensive longitudinal acceleration sensor may be unnecessary as an input device. The ABS system of the embodiment can prevent or suppress undesired overshooting during the moderate pressure reduction control and during the moderate pressure build-up control, and reduce the frequency of executions of the skid control, thus reducing the brake fluid consumption, and consequently down-sizing the ABS pump. Furthermore, the ABS system of the embodiment has a tendency for the skid control frequency to properly fluctuate or change during the moderate pressure reduction control and during the moderate pressure build-up control. Moreover, there is a relatively small rate of change in brake-fluid pressure PB during one execution cycle of the moderate pressure reduction operating mode or the moderate pressure build-up operating mode, thereby avoiding or suppressing the occurrence of noises and vibrations. Moreover, the ABS system of the embodiment uses the PI feedback control, thus enhancing the convergence of the wheel-brake cylinder pressure to the desired value, and ensuring a high skid-control accuracy and a high adaptability to a rapid change in the friction factor p of the road surface, such as in the event of the occurrence of the $\mu$-jump or $\mu$-change road condition. Although the anti-skid control system of the invention is exemplified in a front-wheel-drive vehicle equipped with a dual brake system, it will be appreciated that the system of the invention can be applied to a rear-wheel-drive vehicle equipped with a dual brake system.

The entire contents of Japanese Patent Application No. P2001-084701 (filed Mar. 23, 2001) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An anti-skid control system for an automotive vehicle comprising:

a wheel speed sensor that outputs a sensor signal indicative of a wheel speed at each of road wheels on the vehicle;

a hydraulic modulator having electromagnetic solenoid valves for regulating a wheel-brake cylinder pressure at each of the road wheels;

a skid control unit configured to be electronically connected to the wheel speed sensor and the solenoid valves, for preventing a wheel lock-up condition by controlling the wheel-brake cylinder pressure via on/off reaction of the solenoid valves in response to a pulse signal based on the wheel speed; the skid control unit comprising:

(a) a desired wheel speed generation section that generates a desired wheel speed based on the wheel speed;

(b) a wheel-speed deviation calculation section that calculates a wheel-speed deviation between the desired wheel speed and the wheel speed;

(c) a desired brake-fluid pressure calculation section that calculates a desired brake-fluid pressure based on an integrated value of the wheel-speed deviation;

(d) a controlled ON pulse width setting section that sets a controlled ON pulse width based on the desired brake-fluid pressure; and (e) a pulse output control section that outputs the pulse signal having the controlled pulse width to the solenoid valves after a lapse of a preset pulse width from a previous pulse signal output.

2. The anti-skid control system as claimed in claim 1, wherein:

the preset pulse width is set at a time interval ranging from 2 milliseconds to 8 milliseconds.

3. The anti-skid control system as claimed in claim 1, which further comprises:

a pseudo vehicle speed calculation section that calculates a pseudo vehicle speed based on the wheel speeds at the road wheels;

wherein the desired wheel speed generation section sets the desired wheel speed to a speed value that gradually converges from the wheel speed substantially corresponding to a spin-up point toward an optimum-slip-ratio wheel-speed value corresponding to an optimum slip ratio that provides maximum effective braking each time either of the wheel speed and the pseudo vehicle speed changes from an increasing state to a decreasing state substantially at the spin-up point.

4. The anti-skid control system as claimed in claim 3, wherein:

the desired wheel speed generation section comprises a first-order low-pass filter, so that the desired wheel speed is converged toward the optimum-slip-ratio wheel-speed value by way of a first-order low-pass filtering process.

5. The anti-skid control system as claimed in claim 1, wherein:

the pulse output control section outputs the pulse signal having the controlled pulse width to the solenoid valves when the controlled ON pulse width of a current pulse signal output exceeds the preset pulse width after a predetermined time duration ranging from 30 milliseconds to 60 milliseconds has expired from the previous pulse signal output.

6. The anti-skid control system as claimed in claim 1, wherein:

the skid control unit comprises a wheel acceleration calculation section that calculates a wheel acceleration based on the sensor signal from the wheel speed sensor;

the pulse output control section comprises:

(1) a first arithmetic calculation section that calculates a feed-forward pressure reduction controlled variable based on the wheel acceleration;

(2) a second arithmetic calculation section that calculates a feed-forward pressure build-up controlled variable based on the wheel acceleration; and the pulse output control section outputs a feed-forward output of the pulse signal having a controlled ON pulse width determined responsively to the feed-forward pressure reduction controlled variable based on the wheel acceleration at an initial pressure reduction operating mode of skid control, and outputs a feed-forward output of the pulse signal having a controlled ON pulse width determined responsively to the feed-forward pressure build-up controlled variable based on the wheel acceleration at an initial pressure build-up operating mode of skid control.

7. The anti-skid control system as claimed in claim 6, wherein:

the desired brake-fluid pressure calculation section performing functions:

(1) calculating a deviation equivalent pressure value PP by multiplying the wheel-speed deviation by a first gain for conversion of the wheel-speed deviation into a brake-fluid pressure value;

(2) calculating an integrated pressure value IP from an expression $IP_{(n)}=IP_{(n-1)}+KI\times\Delta VW$, where $IP_{(n)}$ denotes the integrated pressure value IP calculated at a current cycle, KI denotes a second gain, $IP_{(n-1)}$ denotes the integrated pressure value IP calculated one cycle before, and $\Delta VW$ denotes the wheel-speed deviation;

(3) determining whether either of (i) a first condition in which switching from a state that the wheel acceleration is greater than 0 to a state that the wheel acceleration is less than or equal to 0 occurs and (ii) a second condition in which switching from a state that the wheel speed is greater than the optimum-slip-ratio wheel-speed value to a state that the wheel speed is less than or equal to the optimum-slip-ratio wheel-speed value occurs is satisfied;

(4) setting the integrated pressure value IP to 0 when either of the first and second conditions is satisfied;

(5) setting the integrated pressure value IP to the integrated pressure value calculated from the expression $IP_{(n)}=IP_{(n-1)}+KI\times\Delta VW$, when the first and second conditions are both unsatisfied; and (6) setting a sum of the deviation equivalent pressure value PP and the integrated pressure value IP as the desired brake-fluid pressure.

8. An anti-skid control system for an automotive vehicle comprising:

a wheel speed detection means for outputting a sensor signal indicative of a wheel speed at each of road wheels on the vehicle;

hydraulic modulating means having electromagnetic solenoid valves for regulating a wheel-brake cylinder pressure at each of the road wheels;

skid control means configured to be electronically connected to the wheel speed detection means and the solenoid valves, for preventing a wheel lock-up condition by controlling the wheel-brake cylinder pressure via on/off reaction of the solenoid valves in response to a pulse signal based on the wheel speed; the skid control means comprising:

(a) desired wheel speed generation means for generating a desired wheel speed based on the wheel speed;

(b) wheel-speed deviation calculation means for calculating a wheel-speed deviation between the desired wheel speed and the wheel speed;

(c) desired brake-fluid pressure calculation means for calculating a desired brake-fluid pressure based on an integrated value of the wheel-speed deviation;

(d) controlled ON pulse width setting means for setting a controlled ON pulse width based on the desired brake-fluid pressure; and (e) pulse output control means for outputting the pulse signal having the controlled pulse width to the solenoid valves after a lapse of a preset pulse width from a previous pulse signal output.

9. The anti-skid control system as claimed in claim 8, wherein:
the preset pulse width is set at a time interval ranging from 2 milliseconds to 8 milliseconds.

10. The anti-skid control system as claimed in claim 8, which further comprises:
pseudo vehicle speed calculation means for calculating a pseudo vehicle speed based on the wheel speeds at the road wheels;
wherein the desired wheel speed generation means sets the desired wheel speed to a speed value that gradually converges from the wheel speed substantially corresponding to a spin-up point toward an optimum-slip-ratio wheel-speed value corresponding to an optimum slip ratio that provides maximum effective braking each time either of the wheel speed and the pseudo vehicle speed changes from an increasing state to a decreasing state substantially at the spin-up point.

11. The anti-skid control system as claimed in claim 10, wherein:
the desired wheel speed generation means comprises a first-order low-pass filter, so that the desired wheel speed is converged toward the optimum-slip-ratio wheel-speed value by way of a first-order low-pass filtering process.

12. The anti-skid control system as claimed in claim 8, wherein:
the pulse output control means outputs the pulse signal having the controlled pulse width to the solenoid valves when the controlled ON pulse width of a current pulse signal output exceeds the preset pulse width after a predetermined time duration ranging from 30 milliseconds to 60 milliseconds has expired from the previous pulse signal output.

13. The anti-skid control system as claimed in claim 8, wherein:
the skid control means comprises wheel acceleration calculation means for calculating a wheel acceleration based on the sensor signal from the wheel speed detection means;
the pulse output control means comprises:
(1) first arithmetic calculation means for calculating a feed-forward pressure reduction controlled variable based on the wheel acceleration;
(2) second arithmetic calculation means for calculating a feed-forward pressure build-up controlled variable based on the wheel acceleration; and
the pulse output control means outputs a feed-forward output of the pulse signal having a controlled ON pulse width determined responsively to the feed-forward pressure reduction controlled variable based on the wheel acceleration at an initial pressure reduction operating mode of skid control, and outputs a feed-forward output of the pulse signal having a controlled ON pulse width determined responsively to the feed-forward pressure build-up controlled variable based on the wheel acceleration at an initial pressure build-up operating mode of skid control.

14. The anti-skid control system as claimed in claim 13, wherein:
the desired brake-fluid pressure calculation means performing functions:
(1) calculating a deviation equivalent pressure value PP by multiplying the wheel-speed deviation by a first gain for conversion of the wheel-speed deviation into a brake-fluid pressure value;
(2) calculating an integrated pressure value IP from an expression $IP_{(n)} = IP_{(n-1)} + KI \times \Delta VW$, where $IP_{(n)}$ denotes the integrated pressure value IP calculated at a current cycle, KI denotes a second gain, $IP_{(n-1)}$ denotes the integrated pressure value IP calculated one cycle before, and $\Delta VW$ denotes the wheel-speed deviation;
(3) determining whether either of (i) a first condition in which switching from a state that the wheel acceleration is greater than 0 to a state that the wheel acceleration is less than or equal to 0 occurs and (ii) a second condition in which switching from a state that the wheel speed is greater than the optimum-slip-ratio wheel-speed value to a state that the wheel speed is less than or equal to the optimum-slip-ratio wheel-speed value occurs is satisfied;
(4) setting the integrated pressure value IP to 0 when either of the first and second conditions is satisfied;
(5) setting the integrated pressure value IP to the integrated pressure value calculated from the expression $IP_{(n)} = IP_{(n-1)} + KI \times \Delta VW$, when the first and second conditions are both unsatisfied; and
(6) setting a sum of the deviation equivalent pressure value PP and the integrated pressure value IP as the desired brake-fluid pressure.

15. An anti-skid control method of an automotive vehicle employing an anti-skid control system for preventing a wheel lock-up condition by controlling a wheel-brake cylinder pressure at each of road wheels via on/off reaction of solenoid valves of a hydraulic modulator in response to a pulse signal based on the wheel speed, the method comprising:
detecting a wheel speed at each of the road wheels on the vehicle;
generating a desired wheel speed based on the wheel speed;
calculating a wheel-speed deviation between the desired wheel speed and the wheel speed;
calculating a desired brake-fluid pressure based on an integrated value of the wheel-speed deviation;
setting a controlled ON pulse width based on the desired brake-fluid pressure; and
outputting the pulse signal having the controlled pulse width to the solenoid valves after a lapse of a preset pulse width from a previous pulse signal output.

16. The method as claimed in claim 15, which further comprises:
detecting a wheel acceleration at each of the road wheels on the vehicle;
calculating a feed-forward pressure reduction controlled variable based on the wheel acceleration;
calculating a feed-forward pressure build-up controlled variable based on the wheel acceleration;
outputting a feed-forward output of the pulse signal having a controlled ON pulse width determined responsively to the feed-forward pressure reduction controlled variable based on the wheel acceleration at an initial pressure reduction operating mode of skid control; and
outputting a feed-forward output of the pulse signal having a controlled ON pulse width determined responsively to the feed-forward pressure build-up controlled variable based on the wheel acceleration at an initial pressure build-up operating mode of skid control.

17. The method as claimed in claim 16, wherein:
calculating a deviation equivalent pressure value PP by multiplying the wheel-speed deviation by a first gain for conversion of the wheel-speed deviation into a brake-fluid pressure value;

calculating an integrated pressure value IP from an expression $IP_{(n)} = IP_{(n-1)} + KI \times \Delta VW$, where $IP_{(n)}$ denotes the integrated pressure value IP calculated at a current cycle, KI denotes a second gain, $IP_{(n-1)}$ denotes the integrated pressure value IP calculated one cycle before, and $\Delta VW$ denotes the wheel-speed deviation;

determining whether either of (i) a first condition in which switching from a state that the wheel acceleration is greater than 0 to a state that the wheel acceleration is less than or equal to 0 occurs and (ii) a second condition in which switching from a state that the wheel speed is greater than the optimum-slip-ratio wheel-speed value to a state that the wheel speed is less than or equal to the optimum-slip-ratio wheel-speed value occurs is satisfied;

setting the integrated pressure value IP to 0 when either of the first and second conditions is satisfied;

setting the integrated pressure value IP to the integrated pressure value calculated from the expression $IP_{(n)} = IP_{(n-1)} + KI \times \Delta VW$, when the first and second conditions are both unsatisfied; and setting a sum of the deviation equivalent pressure value PP and the integrated pressure value IP as the desired brake-fluid pressure.

* * * * *